(12) United States Patent
Ishii et al.

(10) Patent No.: US 7,863,382 B2
(45) Date of Patent: Jan. 4, 2011

(54) RESIN COMPOSITION AND MOLDED ARTICLE COMPRISING THE SAME

(75) Inventors: Hiromitsu Ishii, Nagoya (JP); Takashi Nagao, Nagoya (JP); Hiroyuki Ohme, Nagoya (JP)

(73) Assignee: Toray Industriés, Inc., Tokyo (JP)

( * ) Notice: Subject to any disclaimer, the term of this patent is extended or adjusted under 35 U.S.C. 154(b) by 426 days.

(21) Appl. No.: 11/663,150

(22) PCT Filed: Sep. 20, 2005

(86) PCT No.: PCT/JP2005/017274

§ 371 (c)(1),
(2), (4) Date: Jun. 9, 2008

(87) PCT Pub. No.: WO2006/030951

PCT Pub. Date: Mar. 23, 2006

(65) Prior Publication Data

US 2008/0262151 A1    Oct. 23, 2008

(30) Foreign Application Priority Data

Sep. 17, 2004  (JP) .............................. 2004-272620
Jul. 25, 2005  (JP) .............................. 2005-213840

(51) Int. Cl.
*C08F 242/00* (2006.01)

(52) U.S. Cl. .................. 525/190; 525/186; 525/410; 525/411; 525/413; 525/415; 525/450; 525/461; 525/462; 525/909; 525/911

(58) Field of Classification Search ................. 525/450, 525/439, 410, 411, 413, 415, 461, 462, 186, 525/190, 909, 911

See application file for complete search history.

(56) References Cited

U.S. PATENT DOCUMENTS

| | | | | |
|---|---|---|---|---|
| 5,283,285 A | * | 2/1994 | Akkapeddi et al. | ............ 525/67 |
| 5,300,576 A | * | 4/1994 | Nemphos et al. | ............ 525/190 |
| 5,762,849 A | * | 6/1998 | Argast et al. | ............ 264/176.1 |
| 5,952,450 A | | 9/1999 | Ishihara et al. | |
| 6,897,245 B2 | | 5/2005 | Gen | |

FOREIGN PATENT DOCUMENTS

| | | |
|---|---|---|
| JP | 3279768 | 4/1995 |
| JP | 2000-017038 | 1/2000 |
| JP | 2002-371172 | 12/2002 |
| JP | 2004-190026 | 7/2004 |
| JP | 2004-250549 | 9/2004 |

OTHER PUBLICATIONS

Daihachi Product Data Sheet, 2001 [online], accessed via the Internet [retrieved on Dec. 16, 2009], URL: <http://web.archive.org/web/20040813201203/www.daihachi-chem.co.jp/eng/seihin/index.html>.*

Mitsubishi Metablen A-3800 Product Data Sheet, 2003 [online], accessed via the Internet [retrieved on Dec. 16, 2009], URL: <http://www.mrany.com/data/HTML/45.htm>.*

International Search Report dated Oct. 25, 2005, application No. PCT/JP2005/017274.

* cited by examiner

*Primary Examiner*—David Wu
*Assistant Examiner*—Robert Jones, Jr.
(74) *Attorney, Agent, or Firm*—RatnerPrestia

(57) ABSTRACT

A resin composition in which a polylactic acid resin (A) 95-5 wt %, an aromatic polycarbonate resin (B) 5-95 wt %, and, with respect to 100 wt parts of the total of the (A) and the (B), at least one compatibilizer selected from a polymer compound containing an acrylic resin or styrene resin unit as a graft (C), a polymer compound to which a glycidyl compound or an acid anhydride is grafted or copolymerized (D) and an oxazoline compound, an oxazine compound and a carbodiimide compound (E) are compounded.

8 Claims, 1 Drawing Sheet

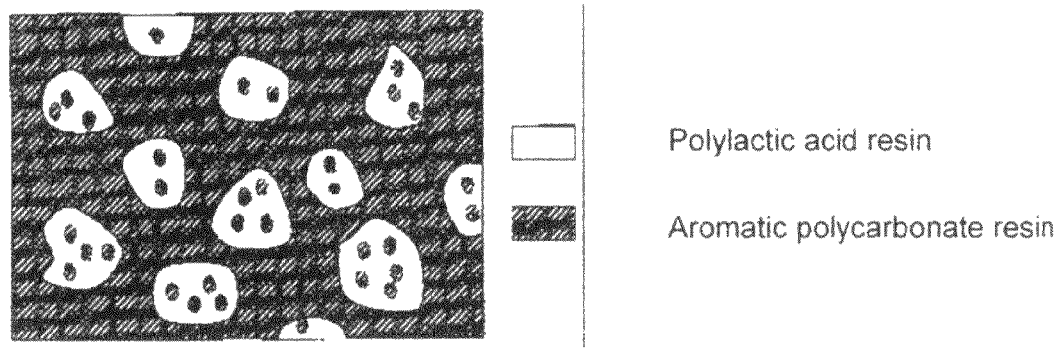
Fig. 1  Illustration of phase structure in specification
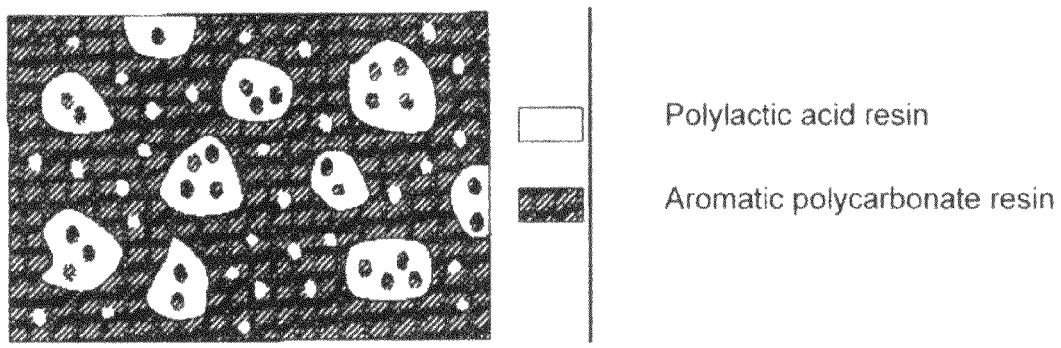
Fig. 2  Illustration of phase structure in specification
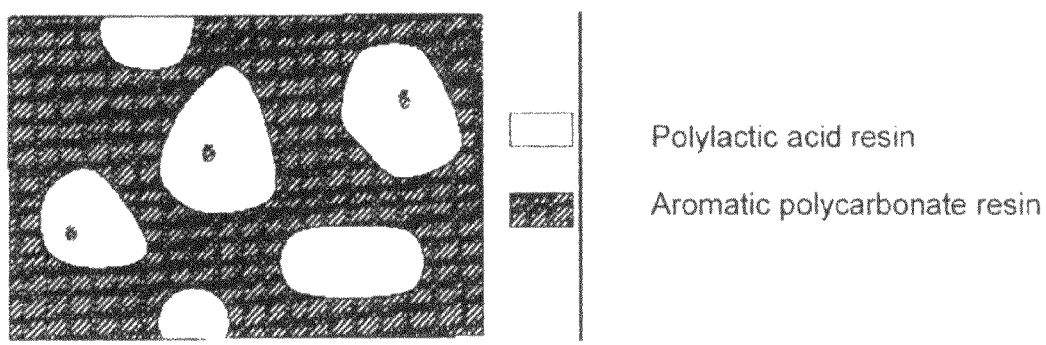
Fig. 3  Illustration of phase structure in specification

RESIN COMPOSITION AND MOLDED ARTICLE COMPRISING THE SAME

This is a U.S. National Phase application of application number PCT/JP2005/017274, filed Sep. 20, 2005.

FIELD OF THE INVENTION

The present invention relates to a resin composition having molded article appearance free from pearl gloss and excellent impact strength (especially, surface impact), and a molded article comprising the same.

BACKGROUND ART

Polylactic acid resin has a high melting point and is moldable in melt, and accordingly, it is expected to be a practically excellent biodegradable polymer. Furthermore, it is expected to be used in future as a widely applicable polymer made from biomaterial, and to be made into various molded articles by injection molding, extrusion molding or the like.

However, the polylactic acid resin is inferior in impact strength and brittle, and an improvement has been desired.

On the other hand, aromatic polycarbonate resin is excellent in transparency, impact resistance and mechanical properties, and has been used in various uses such as transparent products and industrial products, but it has a drawback to be inferior in flowability, and an improvement has been desired.

In the patent reference 1, it is proposed to compound polylactic acid as an improving method of the above-mentioned flowability of the aromatic polycarbonate resin. However, there have been problems that applications of the obtained product are limited due to its pearl gloss and that its productivity is inferior due to the Barus effect at melt/kneading.

In the patent reference 2, it is proposed to compound a polycarbonate to improve impact resistant property of polylactic acid resin.

In the patent reference 3, a composition excellent in foamability in which polyisocyanate compound is compounded in polylactic acid resin and polycarbonate, polystyrene, etc., is prepared.

In the patent reference 4, a medical material in which a multi-functional triazine compound is compounded to a polymer such as polylactic acid resin and polycarbonate, is proposed.

However, the compositions of the patent references 2-4 had a problem of at least one pearl gloss or surface impact, or of being difficult to improve its flame retardancy.

By the way, it is well known to melt/mix two or more kind of polymers as a polymer blend or a polymer alloy, and it is widely used as a method for improving defects of individual polymers. However, in many of cases where two or more kinds of polymers are melted/mixed, the mixture separates into respective phases due to difference of viscosity, molecular weight and molecular structure, has a coarsely dispersed structure and raises the Barus effect at melt/kneading to cause, in most cases, a difficulty to be pelletized, and an uneven mixing is exposed on surface of the obtained injection molded article, and in appearance of the molded article, a pearl gloss, a surface exfoliation or a flow mark is often brought about.

Since the polymer blend of the polylactic acid resin and the aromatic polycarbonate resin used in the present invention also has a phase separated structure separated in the respective phases, the above-mentioned Barus effect at melt/kneading or an uneven mixing by the phase separation on surface of the obtained injection molded article are observed, and therefore, it is estimated that the above-mentioned pear gloss, surface exfoliation or flow mark are brought about.

As a method of improving such a phase separation, it is proposed to compound the following compatibilizers.

In the patent reference 5, it is proposed to melt/mix a radical reaction initiator to polylactic acid resin and polycarbonate in nitrogen atmosphere, but it was still not satisfactory in improvement of impact strength (especially, surface impact).

Furthermore, since polylactic acid resin is flammable itself, it couldn't be used for parts which require a flame retardancy. On the other hand, aromatic polycarbonate resin is known as a less flammable material than polylactic acid resin. However, since its polymer blend composition with polylactic acid resin is flammable, it couldn't be used in parts which require flame retardancy.

In the above-mentioned patent reference 1 and in the patent reference 5, it is disclosed that a flame retardant can be compounded into polylactic acid resin or the like, but any detailed method for obtaining a high flame retardancy was not disclosed.

[patent reference 1] JP Patent No. 3279768 (pages 1-2), (paragraph number [0008])
[patent reference 2] U.S. Pat. No. 5,952,450
[patent reference 3] JP-A-2000-17038 (pages 1-2)
[patent reference 4] U.S. Pat. No. 6,897,245
[patent reference 5] JP-A-2002-371172 (pages 1-2)

DISCLOSURE OF THE INVENTION

Problem to be Solved by the Invention

The present invention is achieved as a result of trying to solve the above-mentioned problem in the conventional arts.

Accordingly, the objects of the present invention is to obtain a resin composition having molded article appearance free from pearl gloss and excellent impact resistance (especially, surface impact) by compounding a compatibilizer, such as a polymer compound containing an acrylic resin or a styrene resin unit as a graft, to a polylactic acid resin and an aromatic polycarbonate resin; furthermore, to obtain a resin composition having flame retardancy by compounding one kind or more flame retardants selected from a bromine-based flame retardant, a phosphorus-based flame retardant, a nitrogen compound-based flame retardant, a silicone-based flame retardant and other inorganic flame retardant; and to provide a molded article comprising the same; and a resin composition characterized in that the dispersed structure of polylactic acid resin component and aromatic polycarbonate resin component has a phase structure in which the aromatic polycarbonate resin component is contained in the polylactic acid resin component in an amount of 5% or more.

Means for Solving the Problem

We, inventors, by finding that a resin composition in which a polymer compound containing an acrylic resin or a styrene resin unit as a graft is compounded to a polylactic acid resin and an aromatic polycarbonate resin; a resin composition in which a polylactic acid resin, an aromatic polycarbonate resin, and a polymer compound to which a glycidyl compound or an acid anhydride is grafted or copolymerized are compounded; a resin composition in which a polylactic acid resin, an aromatic polycarbonate resin, and at least one kind of compatibilizer selected from an oxazoline compound, an oxazine compound and a carbodiimide compound are compounded; a flame retardant resin composition to which one kind or more flame retardant selected from a bromine-based flame retardant, a phosphorus-based flame retardant, a nitrogen compound-based flame retardant, a silicone-based flame retardant and other inorganic flame retardant is compounded; and a resin composition characterized in having a phase structure, in a dispersed structure of a polylactic acid resin component and an aromatic polycarbonate resin component, the aromatic polycarbonate resin component is contained in the polylactic acid resin component in an amount of 5% or more, have excellent characteristics which meet the above-mentioned objects and arrived at the present invention.

That is, the present invention is, (1) A resin composition comprising a polylactic acid resin (A) 95-5 wt %, an aromatic polycarbonate resin (B) 5-95 wt % and a polymer compound (C) containing an acrylic resin or styrene resin unit as a graft 0.1-50 wt parts with respect to 100 wt parts of the total of the component (A) and the component (B).

(2) A resin composition comprising a polylactic acid resin (A) 75-10 wt %, an aromatic polycarbonate resin (B) 25-90 wt % and a polymer compound to which a glycidyl compound or an acid anhydride is grafted or copolymerized (D) 1-50 wt parts with respect to 100 wt parts of the total of the component (A) and the component (B).

(3) A resin composition comprising a polylactic acid resin (A) 75-10 wt %, an aromatic polycarbonate resin (B) 25-90 wt % and at least one compatibilizers (E) selected from an oxazoline compound, an oxazine compound and a carbodiimide compound 0.1-15 wt parts with respect to 100 wt parts of the total amount of the component (A) and the component (B).

(4) A resin composition described in (1), characterized in having a phase structure, in a dispersed structure of the component (A) and the component (B), the aromatic polycarbonate resin component (B) is contained 5% or more in the polylactic acid resin component (A).

(5) A resin composition described in any one of (1)-(3), wherein a flame retardant (F) 0.1-50 wt parts with respect to 100 wt parts of the total of the (A) and the (B), is compounded.

(6) A resin composition described in (5), wherein the flame retardant (F) comprises one or more selected from a bromine-based flame retardant, phosphorus-based flame retardant, nitrogen compound-based flame retardant, silicone-based flame retardant and inorganic flame retardant.

(7) A resin composition described in any one of (1) to (3), to which a fluorine-based resin (G) is further compounded.

(8) A resin composition described in (5), wherein a flame retardancy according to the UL standard with a molded article of 1.6 mm thickness (⅙inch) is any one of the flame retardancies V-2, V-1 and V-0.

(9) A flame retardant resin composition described in (5), wherein a flame retardancy according to the UL standard with a molded article of 1.6 mm thickness (⅙inch) is the flame retardancy 5V.

(10) A molded article comprising the resin composition described in any one of (1)-(3).

(11) A molded article described in (10), wherein the molded article is a housing of an OA equipment or an electric equipment.

EFFECT OF THE INVENTION

The present invention relates to a flame retardant resin composition having molded article appearance free from pearl gloss and excellent surface impact, and to a molded article comprising the same, and it is possible to use the molded article of the present invention to effectively use, taking advantage of the above-mentioned characteristics, in various uses such as machine structural parts, electrical electronic parts, construction materials, auto parts and daily necessities.

BEST EMBODIMENT FOR CARRYING OUT THE INVENTION

Hereunder, the present invention is explained in detail.

The polylactic acid resin (A) used in the present invention is a polymer of which main component is L-lactic acid and/or D-lactic acid, but it may contain other copolymerization component than lactic acid. As the other monomer units, glycol compounds such as ethylene glycol, propylene glycol, butanediol, heptanediol, hexanediol, octanediol, nonanediol, decanediol, 1,4-cyclohexane dimethanol, neopentyl glycol, glycerin, pentaerythritol, bisphenol A, polyethylene glycol, polypropylene glycol and polytetramethylene glycol, dicarboxylic acids such as oxalic acid, adipic acid, sebacic acid, azelaic acid, dodecane dioic acid, malonic acid, glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenylether dicarboxylic acid, 5-sodium sulfoisophthalic acid and 5-tetrabutyl phosphonium isophthalic acid, hydroxycarboxylic acids such as glycolic acid, hydroxypropionic acid, hydroxybutyric acid, hydroxyvaleric acid, hydroxycaproic acid and hydroxybenzoic acid, lactones such as caprolactone, valerolactone, propiolactone, undecalactone and 1,5-oxepan-2-one, can be mentioned. It is preferable that these other copolymerization component is, based on the total monomer component, 0-30 mol %, and more preferably, 0-10 mol %.

In the present invention, in view of compatibility, it is preferable to use a polylactic acid resin (A) of which optical purity of lactic acid component is high. That is, it is preferable that, in the total lactic acid component of the polylactic acid resin (A), L-form is contained in 80% or more or D-form is contained in 80% or more, it is especially preferable that L-form is contained in 90% or more, or D-form is contained in 90% or more, it is still more preferable that L-form is contained in 95% or more, or D-form is contained in 95% or more, it is still more preferable that L-form is contained in 98% or more, or D-form is contained in 98% or more.

In addition, it is also preferable to use together a polylactic acid containing L-form of 80% or more and a polylactic acid containing D-form of 80% or more, and it is more preferable to use together a polylactic acid containing L-form in 90% or more and D-form in 90% or more.

As the polylactic acid resin (A), a modified one may be used, for example, it is preferable that, by using a maleic anhydride modified polylactic acid resin, an epoxy modified polylactic acid resin, an amine modified polylactic acid resin or the like, not only heat resistance, but also mechanical properties are likely to increase.

As production methods of making the polylactic acid resin (A), publickly known polymerization methods can be used and, direct polymerization method from lactic acid, ring opening polymerization via lactide or the like can be mentioned.

Regarding molecular weight and molecular weight distribution of the polylactic acid resin (A), it is not especially limited as far as its molding is substantially possible, but as its weight average molecular weight, it generally is 10,000 or more, preferably 40,000 or more, more preferably, 80,000 or more. As its upper limit, in view of flowability at molding, it is preferable to be 350,000 or less. The weight average molecular weight mentioned here means the polymethyl methacrylate (PMMA)-equivalent molecular weight measured by a gel-permeation chromatography.

Regarding melting temperature of the polylactic acid resin (A), it is especially not limited but 120° C. or more is preferable, and further, 150° C. or more is preferable. Since melting temperature of the polylactic acid resin (A) becomes higher as the optical purity becomes higher, for the above-mentioned high melting point polylactic acid resin, it is better to use a high optical purity polylactic acid.

As the aromatic polycarbonate resin (B) of the present invention, aromatic polycarbonates such as aromatic homo- or copolycarbonate obtainable by reacting a aromatic divalent phenol-based compound with phosgene or carbonic acid ester are mentioned, and those of which polymethyl methacrylate (PMMA)-equivalent molecular weight measured by gel-permeation chromatography is in the range of 5,000-500,0000 are preferably used, and those of which glass transition temperature measured by differential scanning calorimeter is in the range of 100-155° C. is preferably used.

Furthermore, as the above-mentioned aromatic divalent phenol-based compound, 2,2-bis(4-hydroxyphenyl) propane, 2,2-bis(4-hydroxy-3,5-dimethylphenyl) propane, bis(4-hydroxyphenyl) methane, 1,1-bis(4-hydroxyphenyl) ethane, 2,2-bis(4-hydroxyphenyl) butane, 2,2-bis(4-hydroxy-3,5-diphenyl) butane, 2,2-bis(4-hydroxy-3,5-diethylphenyl) propane, 2,2-bis(4-hydroxy-3,5-diphenyl) propane, 1,1-bis(4-hydroxyphenyl) cyclohexane, 1-phenyl1, 1-bis(4-hydroxyphenyl)ethane, etc., can be used, and they can be used alone or as a mixture. And, it may contain one kind or more compounds such as hindered phenol-based, sulfur-based or phosphorus-based antioxidant.

Regarding compounding ratio of the components (A) and (B), the polylactic acid resin (A) is 95-5 wt % and the aromatic polycarbonate resin (B) is 5-95 wt %, and it is preferable that the polylactic acid resin (A) is 90-10 wt % and the aromatic polycarbonate resin (B) is 10-90 wt %, and it is especially preferable that the polylactic acid resin (A) is 75-10 wt %, the aromatic polycarbonate resin (B) is 25-90 wt %.

The polymer compound containing an acrylic resin or styrene resin unit as a graft (C) of the present invention, is a polymer which makes the polylactic acid resin (A) and the aromatic polycarbonate resin (B) compatible, and improve surface impact. Here, in case where the component (A) and the component (B) are melt/kneaded without compounding the component (C), there is a problem to be solved that the Barus effect is serious and a melted strand cannot be taken up and causes a difficulty of palletizing, or a problem of spoiling surface appearance of the molded article by a pear gloss, a surface foliation and a flow mark, etc., and they are estimated to be caused because the component (B) is coarsely dispersed in the component (A) without compatibility. However, the component (C) of the present invention improves the compatibility between the component (A) and the component (B), to solve the problem at the above-mentioned melt/kneading and functions to improve surface appearance of the molded article and improves the surface impact.

The polymer compound containing an acrylic resin or styrene resin unit as a graft (C) is a polymer compound containing at least one kind or more of acrylic resin or styrene resin units as branched chain of the graft copolymer, and here, as examples of polymer to be the main chain, a polyolefin, polystyrene, an acryl-based resin, and a polycarbonate resin, etc., can be mentioned. The above-mentioned polyolefin means a homopolymer or mutual copolymer of random, block or graft structure of α-olefins such as ethylene, propylene, butene-1, hexene-1,3-methyl butene-1,4-methyl pentene-1, heptene-1 and octene-1, or a random, block or graft copolymer of more than a half weight of those α-olefin with other unsaturated monomer, and as the other unsaturated monomer mentioned here, unsaturated organic acids or their derivatives such as acrylic acid, methacrylic acid, maleic acid, itaconic acid, methyl acrylate, ethyl acrylate, methyl methacrylate, maleic anhydride, glycidyl methacrylate, an arylmaleimide, an alkyl maleimide or the like, or vinyl esters such as vinyl acetate and vinyl butylate, or aromatic vinyl compounds such as styrene and methyl styrene, or vinyl silanes such as vinyl trimethyl methoxysilane, methacryloyl oxypropyl trimethoxysilane, or non-conjugated dienes such as dicyclopentadiene and 4-ethylidene-2-norbornene, can be used, and in case of copolymerization, the α-olefin or the other monomers are not only limited to two kinds, but may also comprise plural kinds.

Furthermore, the above-mentioned polystyrene means a homopolymer or mutual copolymer of random, block or graft structure of styrene-based monomers such as styrene, methyl styrene and glycidyl substituted styrene, or a random, block or graft copolymer of these of more than a half weight with other unsaturated monomer, and as the other unsaturated monomer mentioned here, unsaturated organic acids or their derivatives such as acrylic acid, methacrylic acid, maleic acid, itaconic acid, methyl acrylate, ethyl acrylate, methyl methacrylate, maleic anhydride, glycidyl methacrylate, arylmaleimide, alkyl maleimide, or vinyl esters such as vinyl acetate and vinyl butylate, or aromatic vinyl compounds such as styrene and methyl styrene, or vinyl silanes such as vinyl trimethyl methoxysilane, methacryloyl oxypropyl trimethoxysilane, or non-conjugated dienes such as dicyclopentadiene and 4-ethylidene-2-norbornene, can be used, and in case of copolymerization, α-olefin or the other monomer are not only limited to two kinds, but may also comprise plural kinds.

Furthermore, the above-mentioned acryl-based resin means a homopolymer or mutual copolymer of random, block or graft structure of acryl-based resin monomers such as acrylic acid, methacrylic acid, methyl acrylate, ethyl acrylate, methyl methacrylate and glycidyl methacrylate, or a random, block or graft copolymer of these of more than a half weight with other unsaturated monomer, and as the other unsaturated monomer mentioned here, unsaturated organic acids or their derivatives such as acrylic acid, methacrylic acid, maleic acid, itaconic acid, methyl acrylate, ethyl acrylate, methyl methacrylate, maleic anhydride, glycidyl methacrylate, arylmaleimide, alkyl maleimide, or vinyl esters such as vinyl acetate and vinyl butylate, or aromatic vinyl compounds such as styrene and methyl styrene, or vinyl silanes such as vinyl trimethyl methoxysilane, methacryloyl oxypropyl trimethoxysilane, or non-conjugated dienes such as dicyclopentadiene and 4-ethylidene-2-norbornene, can be used, and in case of copolymerization, α-olefin or the other monomer are not only limited to two kinds, and may also comprise plural kinds.

Furthermore, as the polycarbonate resins, an aromatic polycarbonate resin of the same kind as the component (B), an aliphatic polycarbonate resin, an aliphatic polyester carbonate resin and a branched (cross-linked) polycarbonate resin or the like are mentioned, or the polycarbonate resin mean a random, block or graft copolymer of these of more than a half weight with other unsaturated monomer, and as the other unsaturated monomer mentioned here, unsaturated organic acids or their derivatives such as acrylic acid, methacrylic acid, maleic acid, itaconic acid, methyl acrylate, ethyl acrylate, methyl methacrylate, maleic anhydride, glycidyl methacrylate, arylmaleimide, alkyl maleimide, or vinyl esters such as vinyl acetate and vinyl butylate, or aromatic vinyl compounds such as styrene and methyl styrene, or vinyl silanes such as vinyl trimethyl methoxysilane and methacryloyl oxypropyl trimethoxysilane, or non-conjugated dienes such as dicyclopentadiene and 4-ethylidene-2-norbornene, can be used, and in case of copolymerization, α-olefin or the other monomer are not only limited to two kinds, but may also comprise plural kinds.

Here, the acrylic resin introduced by the graft polymerization is a polymer obtainable by polymerization of (meth)acrylic acid ester monomer or by copolymerization of (meth)acrylic acid ester monomer and a monomer copolymerizable with it, and as examples of the (meth)acrylic acid ester monomer, esters of (meth)acrylic acid with an alcohol of 1-12 carbons are mentioned, and concretely, methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, octyl (meth)acrylate or the like, can be mentioned. Among them, those obtainable by polymerizing methyl methacrylate alone (hereunder, abbreviated as PMMA), or by polymerizing a mixture of methyl methacrylate and other copolymerizable vinyl- or vinylidene-based monomer are preferable, and those containing 80 wt % or more of methyl methacrylate are more preferable. As the other copolymerizable vinyl- or vinylidene-based monomers, alkyl acrylate with 1-8 carbons such as methyl acrylate, ethyl acrylate, butyl acrylate, 2-ethylhexyl acrylate, styrene and acrylonitrile are preferably mentioned. The methacryl resin to be introduced is not limited to one kind, but can also be plural kinds.

Similarly, as the styrene resin to be introduced, styrene alone (hereunder, abbreviated as PS), or a copolymer of styrene and acrylonitrile (hereunder, abbreviated as AS) is preferably used.

Furthermore, as examples of the polymer compound containing acrylic resin or styrene resin unit as a graft, polyethylene-g-polymethyl methacrylate (PE-g-PMMA)("-g-" means graft. Hereunder, the same.), polypropylene-g-polymethyl methacrylate (PP-g-PMMA), poly(ethylene/propylene)-g-polymethyl methacrylate (EPM-g-PMMA) ("-/-" means copolymerization. Hereunder, the same.), poly(ethylene/ethyl acrylate)-g-polymethyl methacrylate (EEA-g-PMMA), poly(ethylene/vinyl acetate)-g-polymethyl methacrylate (EVA-g-PMMA), poly(ethylene/methyl acrylate/maleic anhydride)-g-polymethyl methacrylate (E/EA/MAH-g-PMMA), poly(ethylene/glycidyl methacrylate)-g-polymethyl methacrylate (E/GMA-g-PMMA), poly(ethyl acrylate/glycidyl methacrylate)-g-polymethyl methacrylate (EA/GMA-g-PMMA), polycarbonate-g-polymethyl methacrylate (PC-g-PMMA), polyethylene-g-polystyrene (PE-g-PS), polypropylene-g-polystyrene (PP-g-PS), poly(ethylene/propylene)-g-polystyrene (EPM-g-PS), poly(ethylene/methyl acrylate)-g-polystyrene (EEA-g-PS), poly(ethylene/vinyl acetate)-g-polystyrene (EVA-g-PS), poly(ethylene/methyl acrylate/maleic anhydride)-g-polystyrene (E/EA/MAH-g-PS), poly(ethylene/glycidyl methacrylate)-g-polystyrene (E/GMA-g-PS), poly(ethyl acrylate/glycidyl methacrylate)-g-polystyrene (EA/GMA-g-PS), polycarbonate-g-polystyrene (PC-g-PS), polyethylene-g-AS (PE-g-AS), polypropylene-g-AS (PP-g-AS), poly(ethylene/propylene)-g-AS (EPM-g-AS), poly(ethylene/ethyl acrylate)-g-AS (EEA-g-AS), poly(ethylene/vinyl acetate)-g-AS (EVA-g-AS), poly(ethylene/ethyl acrylate/maleic anhydride)-g-AS (E/EA/MAH-g-AS), poly(ethylene/glycidyl methacrylate)-g-AS (E/GMA-g-AS), poly(ethyl acrylate/glycidyl methacrylate)-g-AS (EA/GMA-g-AS), polycarbonate-g-AS (PC-g-AS), etc., are mentioned, and in particular, poly(ethylene/glycidyl methacrylate)-g-polymethyl methacrylate (E/GMA-g-PMMA), poly(ethylene/glycidyl methacrylate)-g-polystyrene (E/GMA-g-PS), poly(ethylene/glycidyl methacrylate)-g-AS (E/GMA-g-AS) or the like are mentioned as preferable examples. Such a polymer compound containing methacryl resin or styrene resin unit as a graft of the component (C) may be used alone or two kinds or more together.

Furthermore, the compounding ratio of the component (C) is preferably 0.1 wt parts-50 wt parts, with respect to 100 wt parts of the total amount of the polylactic acid resin (A) and the aromatic polycarbonate resin (B), more preferably, 0.2 wt parts-40 wt parts, especially preferably, 0.3 wt parts-30 wt parts, and if it is less than 0.1 wt parts, effect of improvement of compatibility and surface impact is small, and if it exceeds 50 wt parts, it is not preferable since mechanical properties decrease.

The polymer compound to which a glycidyl compound or an acid anhydride is grafted or copolymerized (D) of the present invention is a compound which makes the polylactic acid resin (A) and the aromatic polycarbonate resin (B) compatible. Here, in case where the component (A) and the component (B) are melt/kneaded without compounding the compatibilizer, component (D), there is a problem to be solved that the Barus effect is serious and a melted strand cannot be taken up to cause a difficulty of palletizing, or a problem of spoiling surface appearance of the molded article by a pearl gloss, a surface foliation and a flow mark, etc., and it is estimated to be brought about because the component (B) and the component (A) are coarsely dispersed without compatibility. And, the compatibilizer (D) of the present invention functions to improve the compatibility between the component (A) and the component (C), to finely disperse them.

The polymer compound to which a glycidyl compound or an acid anhydride is grafted or copolymerized (D) of the present invention does not include the polymer compound of the above-mentioned (C). As the glycidyl compounds, glycidyl esters of unsaturated organic acid such as glycidyl acrylate, glycidyl methacrylate, glycidyl ethacrylate, glycidyl itaconate, glycidyl ethers such as ally glycidyl ether and derivatives thereof (for example, 2-methyl glycidyl methacrylate or the like) are mentioned, and among them, glycidyl acrylate and glycidyl methacrylate can preferably be used, and they can be used alone or in a combination of two or more of them.

Furthermore, as the acid anhydride, maleic anhydride or the like is preferably mentioned.

Furthermore, an amount of glycidyl compound or an acid anhydride to graft polymerize or copolymerize to the polymer compound is not especially limited, but it is preferable to be 0.05 wt % or more and 20 wt % or less with respect to the polymer compound, and 0.1 wt % or more and 5 wt % or less is more preferable.

The polymer compound to which the glycidyl compound or the acid anhydride is grafted or copolymerized is not especially limited, but it is a polymer compound containing the above-mentioned glycidyl compound or acid anhydride grafted or copolymerized to an acrylonitrile/styrene, ethylene copolymer, polyamide resin or the like, and one kind or two kinds or more selected from them are used. And, as examples of the above-mentioned ethylene copolymer, a copolymer made from ethylene as a monomer and, as copolymerizable monomer, propylene, butene-1, vinyl acetate, isoprene, butadiene, or monocarboxylic acids such as acrylic acid or esters thereof, or dicarboxylic acids such as maleic acid, fumaric acid and itaconic acid, are mentioned, and, as a part of examples, acrylonitrile/styrene/glycidyl methacrylate, ethylene/propylene-g-maleic anhydride, ethylene/glycidyl methacrylate, ethylene ethyl acrylate-g-maleic anhydride, ethylene/butene-1-g-maleic anhydride or the like are mentioned ("-/-" means copolymerization and "-g-" means graft. Hereunder, the same.).

Furthermore, the compounding ratio of the polymer compound containing the glycidyl compound or the acid anhydride grafted or copolymerized, is preferably 50 wt parts-1 wt part with respect to the 100 wt parts of the total amount of the polylactic acid resin (A) and the aromatic polycarbonate resin (B), more preferably, 40 wt parts-3 wt parts, especially preferably, 30 wt parts-4 wt parts, and if it is 1 wt part or less, its effect as compatibilizer is small, and if it exceeds 50 wt parts, it is not preferable since heat resistance and mechanical properties decrease seriously.

The oxazoline compound, oxazine compound and carbodiimide compound (E) of the present invention makes the polylactic acid resin and the aromatic polycarbonate resin (B) compatible and improve their flowability. Here, in case where the component (A) and the component (B) are melt/kneaded without compounding the component (E), there is a problem to be solved that the Barus effect is serious and a melted strand cannot be taken up to cause a difficulty of palletizing, or a problem of spoiling surface appearance of the molded article by a pearl gloss, a surface foliation and a flow mark, etc., and it is estimated to be brought about because the component (B) is coarsely dispersed in the component (A) without compatibility. However, the component (E) of the present invention improves the compatibility between the component (A) and the component (B), to solve the problem at the above-mentioned melt/kneading and improves surface appearance of the molded article.

Such an oxazoline compound, oxazine compound and carbodiimide compound (E) may be used alone or two or more together.

Furthermore, a compounding ratio of the component (E) is preferably 0.1 wt parts-15 wt parts with respect to 100 wt parts of the total amount of the polylactic acid resin (A) and the aromatic polycarbonate resin (B), more preferably, 0.2 wt parts-14 wt parts, and especially preferably, 0.3 wt parts-13 wt parts.

The above-mentioned oxazoline compound is a compound having at least one oxazoline ring in its molecule, and as examples of the oxazoline compound, 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphnoxy-2-oxazoline, 2-o-propylphenoxy-2-oxazoline, 2-o-phenylphenoxy-2-oxazoline, 2-m-ethylphnoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propyl phenyl-2-oxazoline, 2-o-phenylphenyl-2-oxazoline, 2-m-ethylphenyl-2-oxazoline, 2-m-propyl phenyl-2-oxazoline, 2-p-phenylphenyl-2-oxazoline, 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylene bis(2-oxazoline), 2,2'-m-phenylene bis(2-oxazoline), 2,2'-o-phenylene bis(2-oxazoline), 2,2'-p-phenylene bis(4-methyl-2-oxazoline), 2,2'-p-phenylene bis(4,4'-dimethyl-2-oxazoline), 2,2'-m-phenylene bis(4-methyl-2-oxazoline), 2,2'-m-phenylene bis(4,4'-dimethyl-2-oxazoline), 2,2'-ethylene bis(2-oxazoline), 2,2'-tetramethylene bis(2-oxazoline), 2,2'-hexamethylene bis(2-oxazoline), 2,2'-octamethylene bis(2-oxazoline), 2,2'-decamethylene bis(2-oxazoline), 2,2'-ethylene bis(4-methyl-2-oxazoline), 2,2'-tetramethylene bis(4,4'-dimethyl-2-oxazoline), 2,2'-9,9'-diphenoxyethane bis(2-oxazoline), 2,2'-cyclohexylene bis(2-oxazoline), 2,2'-diphenylene bis(2-oxazoline), etc., are mentioned, and among the above-mentioned oxazoline compounds, 2,2'-m-phenylene bis(2-oxazoline) and 2,2'-p-phenylene bis(2-oxazoline) are preferably used.

Furthermore, a polymer compound to which the above-mentioned oxazine compound is grafted or copolymerized can also be preferably used, and as examples, bisoxazine/styrene/maleic anhydride copolymer, bisoxazine/maleic anhydride modified polyethylene, bisoxazine/maleic anhydride modified polypropylene or the like are mentioned. Furthermore, it may be a mixture of the polymer compound to which the above-mentioned oxazine compound and/or the oxazoline compound is grafted or copolymerized and a thermoplastic resin, and one kind or more of them may be used.

The above-mentioned oxazine compound is a compound having at least one oxazine ring in its molecule, and as examples of the oxazine compound, 2-methoxy-5,6-dihydro-4H-1,3-oxazine, 2-ethoxy-5,6-dihydro-4H-1,3-oxazine, 2-propoxy-5,6-dihydro-4H-1,3-oxazine, 2-butoxy-5,6-dihydro-4H-1,3-oxazine, 2-pentyloxy-5,6-dihydro-4H-1,3-oxazine, 2-hexyloxy-5,6-dihydro-4H-1,3-oxazine, 2-heptyloxy-5,6-dihydro-4H-1,3-oxazine, 2-octyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-cyclohexyloxy-5,6-dihydro-4H-1,3-oxazine, 2-allyloxy-5,6-dihydro-4H-1,3-oxazine, 2-methallyloxy-5,6-dihydro-4H-1,3-oxazine, 2-crotyl oxy-5,6-dihydro-4H-1,3-oxazine or the like are mentioned, and furthermore, 2,2'-bis(5,6-dihydro-4H-1,3-oxazine), 2,2'-methylene bis(5,6-dihydro-4H-1,3-oxazine), 2,2'-ethylene bis (5,6-dihydro-4H-1,3-oxazine), 2,2'-propylene bis(5,6-dihydro-4H-1,3-oxazine), 2,2'-butylene bis(5,6-dihydro-4H-1,3-oxazine), 2,2'-hexamethylene bis(5,6-dihydro-4H-1,3-oxazine), 2,2'-p-phenylene bis(5,6-dihydro-4H-1,3-oxazine), 2,2'-m-phenylene bis(5,6-dihydro-4H-1,3-oxazine), 2,2'-naphthylene bis(5,6-dihydro-4H-1,3-oxazine), 2,2'-P,P'-diphenylene bis(5,6-dihydro-4H-1,3-oxazine) or the like are mentioned.

Furthermore, a polymer compound to which the above-mentioned oxazine compound is grafted or copolymerized can also be preferably used, and as examples, oxazine/styrene/maleic anhydride copolymer, oxazine/maleic anhydride modified polyethylene, oxazine/maleic anhydride modified polypropylene or the like are mentioned. Furthermore, it may be a mixture of the polymer compound to which the above-mentioned oxazine compound and/or the oxazoline compound is grafted or copolymerized and a thermoplastic resin, and one kind or more of them may be used.

The above-mentioned carbodiimide compound is a compound having at least one carbodiimide group, represented by (—N=C=N—), in its molecule, and for example, it can be produced through decarbonation reaction by heating an organic isocyanate in presence of a suitable catalyst.

As examples of carbodiimide compound, mono- or dicarbociimide compounds such as diphenyl carbodiimide, dicyclohexyl carbodiimide, di-2,6-dimethyl phenyl carbodiimide, diisopropyl carbodiimide, dioctyl decyl carbodiimide, di-o-toluoyl carbodiimide, di-p-toluoyl carbodiimide, di-p-nitrophenyl carbodiimide, di-p-aminophenyl carbodiimide, di-p-hydroxyphenyl carbodiimide, di-p-chlorophenyl carbodiimide, di-o-chlorophenyl carbodiimide, di-3,4-dichlorophenyl carbodiimide, di-2,5-dichlorophenyl carbodiimide, p-phenylene-bis-o-toluoyl carbodiimide, p-phenylene-bis-dicyclohexyl carbodiimide, p-phenylene-bis-di-p-chlorophenyl carbodiimide, 2,6,2',6'-tetraisopropyl diphenyl carbodiimide, hexamethylene-bis-cyclohexyl carbodiimide, ethylene bis-diphenyl carbodiimide, ethylene bis-di-cyclohexyl carbodiimide, N,N'-di-o-triyl carbodiimide, N,N'-diphenyl carbodiimide, N,N'-dioctyl decyl carbodiimide, N,N'-di-2,6-dimethyl phenyl carbodiimide, N-triyl-N'-cyclohexyl carbodiimide, N,N'-di-2,6-diisopropyl phenyl carbodiimide, N,N'-di-2,6-di-tert-butylphenyl carbodiimide, N-toluoyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, N,N'-di-p-toluoyl carbodiimide, N,N'-benzyl carbodiimide, N-octadecyl-N'-phenyl carbodiimide, N-benzyl-N'-phenyl carbodiimide, N-octadecyl-N'-tolyl carbodiimide, N-cyclohexyl-N'-tolyl carbodiimide, N-phenyl-N'-tolyl carbodiimide, N-benzyl N'-tolyl carbodiimide, N,N'-di-o-ethyl phenyl carbodiimide, N,N'-di-p-ethyl phenyl carbodiimide, N,N'-di-o-isopropyl phenyl carbodiimide, N,N'-di-p-isopropyl phenyl carbodiimide, N,N'-di-o-isobutyl phenyl carbodiimide, N,N'-di-p-isobutyl phenyl carbodiimide, N,N'-di-2,6-diethylphenyl carbodiimide, N,N'-di-2-ethyl-6-isopropyl phenyl carbodiimide, N,N'-di-2-isobutyl-6-isopropyl phenyl carbodiimide, N,N'-di-2,4,6-trimethyl phenyl carbodiimide, N,N'-di-2,4,6-triisopropyl phenyl carbodiimide and N,N'-di-2,4,6-triisobutylphenyl carbodiimide, and polycarbodiimides such as poly(1,6-hexamethylene carbodiimide), poly(4,4'-methylene bis cyclohexyl carbodiimide), poly(1,3-cyclohexylene carbodiimide), poly(1,4-cyclohexylene carbodiimide), poly(4,4'-diphenylmethane carbodiimide), poly(3,3'-dimethyl-4,4'-diphenyl methane carbodiimide), poly (naphthylene carbodiimide), poly(p-phenylene carbodiimide), poly(m-phenylene carbodiimide), poly(tolyl carbodiimide), poly(diisopropyl carbodiimide), poly(methyl-diisopropyl phenylene carbodiimide), poly(triethyl phenylene carbodiimide), poly(triisopropyl phenylene carbodiimide) or the like are mentioned. Among them, N,N'-di-2,6-diisopropyl phenyl carbodiimide and 2,6,2',6'-tetraisopropyl diphenyl carbodiimide are preferable. Furthermore, it may be a mixture of the above-mentioned carbodiimide compound and a thermoplastic resin, or a mixture of the carbodiimide compound reacted with end groups of a thermoplastic resin, and one kind or more of them may be used.

In addition, in the present invention, an inorganic filler can be compounded, and it has an effect of improving molded article appearance of the flame retardant resin composition. As the inorganic fillers, for example, plate-like, needle-like, fibrous and particulate ones are mentioned, and inorganic fillers capable of finely dispersing in the resin composition is preferable, and silica minerals, silicate minerals or other various minerals pulverized by crashing or the like are preferably used. For example, bentonite, dolomite, barite, micro-powdered silicate, aluminum silicate, silica, dawsonite, silas balloon, clay, sericite, feldspar powder, kaolin, zeolite (including synthetic zeolite), talc, mica and wollastonite (including synthetic wollastonite), glass flake, glass beads, hydrotalcite and silica or the like are mentioned, and talc or silica is preferably used since whiteness of molded article to be obtained is high.

It is preferable that the above-mentioned inorganic filler is an inorganic filler of a plate-like inorganic substance, a needle-like inorganic substance and a particulate inorganic substance, and it is especially preferable that the inorganic filler is of an average particle diameter of 10 μm or less since decrease of mechanical properties is small, and more preferably, 5 μm or less is preferable. As the lower limit, in view of handling during production, it is preferable that average particle diameter is 0.5 μm or more, and average particle diameter of 1 μm or more is more preferable. Here, the measurement of the average particle diameter is defined as the average particle diameter at cumulative distribution of 50% measured by a method of laser diffraction system.

Furthermore, the needle-like inorganic substances such as wollastonite or kaolin preferably has an aspect ratio (average length/average diameter) of 3-20, and when an average diameter is 10 μm or less, fall of mechanical properties is small and more preferably, an average diameter of 5 μm or less is preferable.

By the way, in case of fibrous inorganic filler, tensile elongation and flexural bending as mechanical properties, are large. As a reason for that, it is estimated to be due to the fact that the aspect ratio (average length/average diameter) exceeds 20.

Furthermore, it is preferable that the compounding ratio of the inorganic filler is 0.5 wt parts-50 wt parts with respect to 100 wt parts of the total amount of the polylactic acid resin (A) and the aromatic polycarbonate resin (B), more preferably, 0.7 wt parts-40 wt parts, especially preferably, 1 wt parts-30 wt parts, and if it is 0.5 wt parts or less, an effect of increasing rigidity is small, and if it exceeds 50 wt parts, it is not preferable since surface impact or mechanical property falls.

In the present invention, by compounding a flame retardant (F), it is possible to provide flame retardancy to the resin composition. The flame retardant (F) is not especially limited as far as it is added for purpose of imparting flame retardancy to the resin, and concretely, bromine-based flame retardant, phosphorus-based flame retardant, nitrogen compound-based flame retardant, silicone-based flame retardant and other inorganic flame retardant or the like are mentioned, and at least one or more of them can be selected and used.

As examples of the bromine-based flame retardant used in the present invention, decabromodiphenyl oxide, octabromodiphenyl oxide, tetrabromodiphenyl oxide, tetrabromophthalic anhydride, hexabromocyclododecane, bis(2,4,6-tribromophenoxy)ethane, ethylene bis tetrabromophthalimide, hexabromobenzene, 1,1-sulfonyl[3,5-dibromo-4-(2,3-dibromopropoxy)]benzene, polydibromophenylene oxide, tetrabromobisphenol-S, tris(2,3-dibromopropyl-1) isocyanurate, tribromophenol, tribromophenyl allyl ether, tribromoneopentyl alcohol, brominated polystyrene, brominated polyethylene, tetrabromobisphenol-A, tetrabromobisphenol-A derivative, tetrabromobisphenol-A-epoxy oligomer or polymer, tetrabromobisphenol-A-carbonate oligomer or polymer, brominated epoxy resins such as brominated phenol novolac epoxy, tetrabromobisphenol-A-bis(2-hydroxy diethyl ether), tetrabromobisphenol-A-bis(2,3-dibromopropyl ether), tetrabromobisphenol-A-bis(allyl ether), tetrabromocyclooctane, ethylene bis pentabromodiphenyl, tris(tribromoneopentyl) phosphate, poly(pentabromobenzyl polyacrylate), octabromotrimethyl phenyl indan, dibromoneopentyl glycol, pentabromobenzyl polyacrylate, dibromocresyl glycidyl ether, N,N'-ethylene bis tetrabromophthalimide or the like are mentioned. Among them, tetrabromobisphenol-A-epoxy oligomer, tetrabromobisphenol-A-carbonate oligomer and brominated epoxy resin are preferable.

The phosphorus-based flame retardant used in the present invention is not especially limited and phosphorus-based flame retardants generally used can be used, and typically, organic phosphorus-based compounds such as phosphoric acid esters and polyphosphoric acid salt, or red phosphorus are mentioned.

As examples of the phosphoric acid ester of the above-mentioned organic phosphorus-based compound, condensed phosphoric acid esters such as trimethyl phosphate, triethyl phosphate, tributyl phosphate, tri(2- ethylhexyl) phosphate, tributoxyethyl phosphate, triphenyl phosphate, tricresyl phosphate, trixylenyl phosphate, tris(isopropyl phenyl) phosphate, tris(phenyl phenyl) phosphate, trinaphthyl phosphate, cresyl diphenyl phosphate, xylenyl diphenyl phosphate, diphenyl (2-ethylhexyl) phosphate, di(isopropyl phenyl) phenyl phosphate, monoisodecyl phosphate, 2-acryloyl oxyethyl acid phosphate, 2-methacryloyl oxyethyl acid phosphate, diphenyl-2-acryloyl oxyethyl phosphate, diphenyl-2-methacryloyl oxyethyl phosphate, melamine phosphate, dimelamine phosphate, melamine pyrophosphate, triphenyl phosphine oxide, tricresyl phosphine oxide, diphenyl methane phosphonate, diethyl phenyl phosphonate, resorcinol polyphenyl phosphate, resorcinol poly(di-2,6-xylyl) phosphate, bisphenol A polycresyl phosphate, hydroquinone poly (2,6-xylyl) phosphate and their condensates or the like, can be mentioned. As commercially available condensed phosphoric acid esters, for example, PX-200, PX-201, PX-202, CR-733S, CR-741 and CR747 of Daihachi Chemical Industry Co., Ltd., or the like, can be mentioned. In particular, a condensed phosphoric acid ester shown by the following formula (1) can preferably be used in view of hydrolysis resistance property.

[Formula 1]

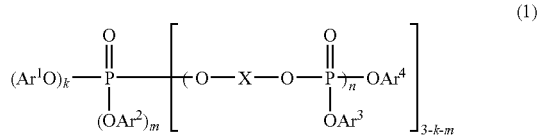
(1)

(In the above formula, $Ar^1$, $Ar^2$, $Ar^3$ and $Ar^4$ respectively denotes an aromatic group with no halogen, which is the same or different from each other. And, X denotes a structure selected from the following formulas (2)-(4), and in the following formulas (2)-(4), $R^1$-$R^8$ respectively denotes hydrogen atom or an alkyl group with 1-5 carbons which may be the same or different from each other, Y denotes direct bond, O, S, $SO_2$, $C(CH_3)_2$, $CH_2$ or CHPh and Ph denotes phenyl group. And, n of the formula (1) is an integer of 0 or more. And, k, m of the formula (1) are respectively an integer of 0-2, and furthermore, (k+m) is an integer of 0 or more and 2 or less.) In addition, these aromatic condensed phosphoric acid esters may be mixtures of aromatic condensed phosphoric acid esters of different n or different structure.

[Formula 2]

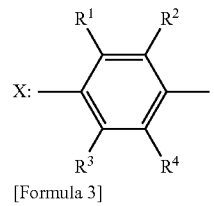
(2)

[Formula 3]

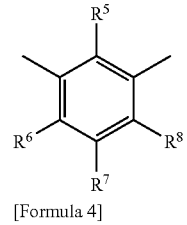
(3)

[Formula 4]

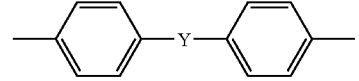
(4)

In the above-mentioned formula (1), n in the formula is an integer of 0 or more, and the upper limit is preferably 40 or less in view of flame retardancy. It is preferably, 0-10, especially preferably, 0-5.

Furthermore, k and m is respectively an integer of 0 or more and 2 or less, in addition, k+m is an integer of 0 or more and 2 or less, but preferably, k and m is respectively an integer of 0 or more and 1 or less, especially preferably, k and m are 1, respectively.

Furthermore, in the above-mentioned formulas (2)-(4), each of $R^1$-$R^8$ in the formulas denote hydrogen or an alkyl group with 1-5 carbon atoms which may be the same or different with each other. Here, as examples of the alkyl group with 1-5 carbon atoms, methyl group, ethyl group, n-propyl group, isopropyl group, n-butyl group, sec-butyl group, tert-butyl group, neopentyl group or the like are mentioned, but hydrogen, methyl group and ethyl group are preferable, and in particular, hydrogen is preferable.

Furthermore, $Ar^1$, $Ar^2$, $Ar^3$, $Ar^4$ denote the same or different aromatic group with no halogen. As such aromatic groups, aromatic groups having benzene skeleton, naphthalene skeleton, indene skeleton and anthracene skeleton are mentioned, and among them, those having benzene skeleton or naphthalene skeleton are preferable. They may be substituted by an organic residual group with no halogen (preferably, an organic residual group having 1-8 carbons), and there is no limitation in the number of substituted group, but 1-3 groups are preferable. As examples, aromatic groups such as phenyl group, tolyl group, xylyl group, cumenyl group, mesityl group, naphthyl group, indenyl group and anthryl group are mentioned, but phenyl group, tolyl group, xylyl group, cumenyl group and naphthyl group are preferable, especially, phenyl group, tolyl group and xylyl group are preferable.

Among them, the following compounds (5) and (6) are preferable, and especially compound (5) is preferable.

[Formula 5]

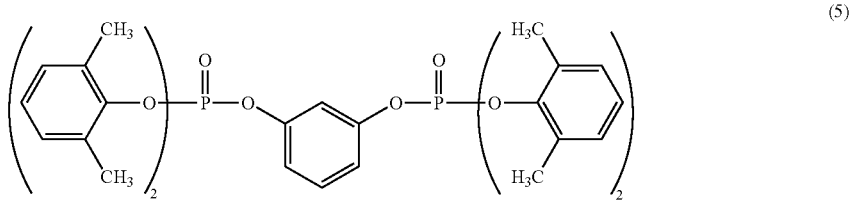

[Formula 6]

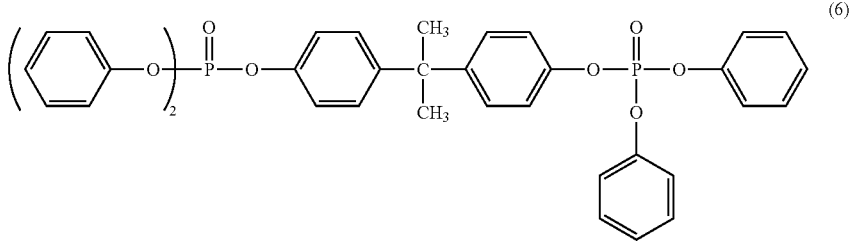

Furthermore, phosphoric acid salts and polyphosphoric acid salts obtainable from phosphoric acid, polyphosphoric acid, and metals of sub-groups IA-IVB of the periodic table, ammonia, aliphatic amine and aromatic amine, can also be mentioned. As typical salts of the polyphosphoric acid salt, there are, as metal salts, lithium salt, sodium salt, calcium salt, barium salt, iron (II) salt, iron (III) salt, aluminum salt or the like, and as aliphatic amine salts, methyl amine salt, ethylamine salt, diethyl amine salt, triethyl amine salt, ethylene diamine salt, piperazine salt or the like, and as aromatic amine salts, pyridine salt, triazine salt, melamine salt and ammonium salt or the like are mentioned.

Furthermore, other than the above-mentioned, halogen-containing phosphoric acid esters such as trischloroethyl phosphate, tris dichloropropyl phosphate and tris (β-chloropropyl) phosphate), and phosphazene compound having a structure in which phosphorus atom and nitrogen atom are bonded by a double bond, and phosphoric acid ester amide, can be mentioned.

Furthermore, as the red phosphorus, not only untreated red phosphorus, but also red phosphorus treated with at least one coat selected from the group consisting of thermosetting resin coat, metal hydroxide coat and metal plating coat, can preferably be used. As a thermosetting resin for the thermosetting resin coat, there is no limitation as far as it is a resin which can coat red phosphorus, and for example, phenol-formalin-based resin, urea-formalin-based resin, melamine-formalin-based resin, alkyd-based resin or the like are mentioned. As metal hydroxide for the metal hydroxide coat, there is no limitation as far as it is a metal which can coat red phosphorus, and for example, aluminum hydroxide, magnesium hydroxide, zinc hydroxide, titanium hydroxide or the like, can be mentioned. As metal for the metal plating coat, there is no limitation as far as it is a metal which can coat red phosphorus, and Fe, Ni, Co, Cu, Zn, Mn, Ti, Zr, Al, or alloys thereof or the like, are mentioned. Furthermore, these coats may be used in combination of two kinds or more, or they may be laminated as two layers or more.

As the nitrogen compound-based flame retardant used in the present invention, an aliphatic amine compound, an aromatic amine compound, a nitrogen-containing heterocyclic compound, a cyan compound, an aliphatic amide, an aromatic amide, a urea, a thiourea or the like can be mentioned. Here, the nitrogen-containing phosphorus-based flame retardant such as ammonium polyphosphate exemplified as the above-mentioned phosphorus-based flame retardant is not included in the nitrogen compound-based flame retardant mentioned here. As the aliphatic amine, ethylamine, butylamine, diethylamine, ethylenediamine, butylene diamine, triethylene tetramine, 1,2-diaminocyclohexane, 1,2-diaminocyclooctane or the like can be mentioned. As the aromatic amine, aniline, phenylene diamine or the like can be mentioned. As the nitrogen-containing heterocyclic compound, uric acid, adenine, Guanine, 2,6-diaminopurine, 2,4,6-triaminopyridine, triazine compound or the like can be mentioned. As the cyan compound, dicyandiamide or the like can be mentioned. As the aliphatic amide, N,N-dimethyl acetamide or the like can be mentioned. As the aromatic amide, N,N-diphenyl acetamide or the like can be mentioned.

The above-exemplified triazine compounds are nitrogen-containing heterocyclic compounds having triazine skeleton, and triazine, melamine, benzoguanamine, methyl guanamine, cyanuric acid, melamine cyanurate, melamine isocyanurate, trimethyl triazine, triphenyl triazine, amylin, amylide, thiocyanuric acid, diaminomercaptotriazine, diaminomethyl triazine, diaminophenyl triazine, diaminoisopropoxy triazine or the like can be mentioned.

As the melamine cyanurate or the melamine isocyanurate, cyanuric acid or an additive between isocyanuric acid and triazine compound is preferable, and usually, an additive having a composition of 1:1 (mol ratio), or, as the case may be, 1:2 (mol ratio), can be mentioned. And, it can be produced by a publicly known method, for example, by making a mixture of melamine and cyanuric acid or isocyanuric acid into an aqueous slurry, and after mixing well to form a salt between them in a fine particle state, and after a filtration and drying, an additive is generally obtained in a powdery state. And, it is not necessary that the above-mentioned salt is perfectly pure, and a small amount of unreacted melamine, cyanuric acid or isocyanuric acid may remain. And, the average particle diameter before compounding into the resin is, in view of flame retardancy, mechanical strength and surface properties, preferably 100-0.01 μm, and more preferably, 80-1 μm.

Among the nitrogen compound-based flame retardants, the nitrogen-containing heterocyclic compound is preferable, and among them, the triazine compound is preferable, furthermore, melamine cyanurate is preferable.

And, in case where dispersibility of the above-mentioned nitrogen compound-based flame retardant is insufficient, a dispersant such as tris(β-hydroxyethyl) isocyanurate or a publicly known surface treating agent such as polyvinyl alcohol or metal oxide may be used together.

As the silicone-based flame retardant used in the present invention, silicone resin and silicone oil can be mentioned. As the above-mentioned silicone resin, a three dimensional network structure resin obtainable by combining structural units of $SiO_2$, $RSiO_{3/2}$, $R_2SiO$ and $R_3SiO_{1/2}$, or the like can be mentioned. Here, R denotes an alkyl group such as methyl group, ethyl group, propyl group, or an aromatic group such as phenyl group and benzyl group, or a substituent containing vinyl group in the above-mentioned substituent. As the above-mentioned silicone oil, polydimethylsiloxane and a modified polysiloxane where at least one methyl group at side chain or molecular end of polydimethylsiloxane is modified with at least one group selected from hydrogen element, alkyl group, cyclohexyl group, phenyl group, benzyl group, amino group, epoxy group, a polyether group, carboxyl group, mercapto group, chloroalkyl group, an alkyl ester group of higher alcohol, an alcohol group, an aralkyl group, vinyl group or trifluoromethyl group, or a mixture thereof can be mentioned.

As the other inorganic flame retardant used in the present invention, magnesium hydroxide, aluminum hydroxide, antimony trioxide, antimony pentoxide, sodium antimonate, zinc hydroxystannate, zinc stannate, metastannic acid, tin oxide, a tin oxide salt, zinc sulfate, zinc oxide, iron (II) oxide, iron (III) oxide, tin (II) oxide, tin (IV) oxide, zinc borate, calcium borate, ammonium borate, ammonium octamolybdate, metal salt of tungstic acid, composite oxide acid of tungsten and a metalloid, ammonium sulfamate, graphite and expandable graphite or the like can be mentioned. Among them, aluminum hydroxide, zinc borate and expandable graphite are preferable.

The above-mentioned flame retardant (F) may be used alone or two kinds or more together. Here, in case where an aluminum hydroxide is used, it is preferable to use it, by kneading the polylactic acid resin (A) and the aromatic polycarbonate resin (B) beforehand, and melt/mix at melt/kneading temperature of 210° C. or lower.

Among the above-mentioned flame retardant (F), it is preferable to use at least one kind or two kinds or more in combination selected from the phosphorus-based flame retardants, the nitrogen compound-based flame retardants, the silicone-based flame retardants and the other inorganic flame retardants which contain no halogen. In the above-mentioned, in case where two kinds or more flame retardants are used together, it is preferable to use a phosphorus-based flame retardant and another flame retardant together. As a nitrogen compound-based flame retardant used together with the phosphorus-based flame retardant, a nitrogen-containing heterocyclic compound is preferable, and among them, triazine compound is preferable, and furthermore, melamine cyanurate is preferable. And, as a silicone-based flame retardant used together with the phosphorus-based flame retardant, silicone resin is preferable. And, as another inorganic flame retardant used together with the phosphorus-based flame retardant, aluminum hydroxide, zinc borate and expandable graphite are preferable. Furthermore, as for a compounding ratio of the phosphorus-based flame retardant, an arbitrary amount can be used in combination, and especially, it is preferable that an amount of the phosphorus-based flame retardant in 100 wt % of the flame retardant is 5 wt % or more, and 5-95 wt % is preferable.

The compounding ratio of the flame retardant (F) is, with respect to 100 wt parts of the total amount of the polylactic acid resin (A) and the aromatic polycarbonate resin (B), 1-50 wt parts, furthermore, 2-45 wt parts is preferable, especially preferably, 3 wt parts-40 wt parts, and if it is less than 1 wt parts, an effect of imparting flame retardancy is small, and if it exceeds 50 wt parts, it is not preferable since surface impact or mechanical property falls.

In the present invention, in the dispersed structure of the component (A) and the component (B), it is preferable to have a phase structure characterized in that the aromatic polycarbonate resin component (B) is contained 5% or more in the polylactic acid resin component (A). Furthermore, it is preferable to have a phase structure in which the aromatic polycarbonate resin component (B) is contained 10% or more in the polylactic acid resin component (A), 15% or more is especially preferable, and by making it 20% or more, the characteristic feature of the present invention can be exhibited sufficiently.

A typical example of such a phase structure is illustrated in FIG. 1. By having such a structure, surface impact is improved characteristically, and excellent characteristics can be obtained.

A resin composition of such a phase structure can be obtained by kneading each component of the polylactic acid resin (A), the aromatic polycarbonate resin (B) and a polymer compound containing an acrylic resin or styrene resin unit as a graft (C), by a melt/kneading machine excellent in kneading ability such as a twin-screw extruder. At this time, other component such as the flame retardant (F) may be compounded. The component (C) is excellent in compatibility with the polylactic acid resin (A) and the aromatic polycarbonate resin (B), and it is considered that, by reacting a molecular end of the polylactic acid resin (A) with the component (C), a composition of the above-mentioned phase structure can be obtained.

And, in the dispersed structure of the component (A) and the component (B), a dispersed structure, in which a part, preferably, 5% or more, of the polylactic acid resin component (A) is contained in the aromatic polycarbonate component (B), is also preferable.

Furthermore, in the dispersed structure of the component (A) and the component (B), a dispersed structure in which the aromatic polycarbonate resin component (B) is contained 5% or more in the polylactic acid resin component (A) and simultaneously, further the polylactic acid resin component (A) is contained 5% or more in the aromatic polycarbonate component (B), is more preferable. A typical example of such a phase structure is illustrated in FIG. 2. In addition, an example of phase structure which does not correspond to the above mentioned dispersed structure is illustrated in FIG. 3.

As a method of observing the above-mentioned dispersed structure, for example, it is possible to observe a sample cut out from a pellet, a press molded article or an injection molded article by an optical microscope or a transmission electron microscope. In particular, by using a transmission electron microscope, an amount of component (B) can be measured precisely. For example, in case where a sample cut out from a pellet-like resin composition is observed by a transmission electron microscope at 10,000 times magnification and the observed portion is taken as a photograph, in the photograph, the polylactic acid resin component (A) is identified as white color and the aromatic polycarbonate resin component (B) is identified as black color. In case of the polylactic acid resin and the aromatic polycarbonate resin where the component (C) is not compounded, it results in a dispersed structure of the polylactic acid resin component only and the aromatic polycarbonate resin component only, and it is unlikely that the aromatic polycarbonate resin is present in the polylactic acid resin component. On the other hand, in case of the polylactic acid resin and the aromatic polycarbonate resin to which the component (C) is further compounded, a further dispersion of the aromatic polycarbonate resin in the polylactic acid resin component is often observed. The amount of the aromatic polycarbonate resin component in the polylactic acid resin component is measured by image-analyzing the area of the aromatic polycarbonate resin component present in the polylactic acid resin component in the above-mentioned photograph, and from the following formula, the ratio of the aromatic polycarbonate resin component present in the polylactic acid resin component can be determined in %.

> Ratio of aromatic polycarbonate resin component in polylactic acid resin component(%)=(area of aromatic polycarbonate resin component present in polylactic acid resin component)÷(area of polylactic acid resin component)×100

Here, in order to determine ratios of the respective components, from a copy of the above-mentioned photograph, portions indicating the polylactic acid resin component and the aromatic polycarbonate resin component are cut out and weighed, and according to the following formula, the ratio of the aromatic polycarbonate resin component contained in the polylactic acid resin component in % can be determined.

> Ratio of aromatic polycarbonate resin component in polylactic acid resin component(%)=(weight of aromatic polycarbonate resin present in polylactic acid resin)÷(weight of polylactic acid resin)×100

In the present invention, a fluorine-based resin (G) can further be compounded. The fluorine-based resin (G) in the present invention is a resin which contains fluorine in its molecule, concretely, polytetrafluoroethylene, polyhexafluoropropylene, tetrafluoroethylene/hexafluoropropylene copolymer, tetrafluoroethylene/perfluoroalkyl vinyl ether copolymer, tetrafluoroethylene/ethylene copolymer, hexafluoropropylene/propylene copolymer, polyvinylidene fluoride, vinylidene fluoride/ethylene copolymer or the like are mentioned, but among them, polytetrafluoroethylene, tetrafluoroethylene/perfluoroalkyl vinyl ether copolymer, tetrafluoroethylene/hexafluoropropylene copolymer, tetrafluoroethylene/ethylene copolymer and polyvinylidene fluoride are preferable, especially, polytetrafluoroethylene and tetrafluoroethylene/ethylene copolymer are preferable, and further, polytetrafluoroethylene is preferable, and a polytetrafluoroethylene-containing mixed powder comprising a polytetrafluoroethylene particles and an organic polymer is also preferably used. A molecular weight of the fluorine-based resin such as polytetrafluoroethylene is preferably in the range of 100,000-10,000,000, especially those in the range of 100,000-1,000,000 are preferable, and it is especially effective for moldability and flame retardancy in the present invention. As commercially available product of polytetrafluoroethylene, "Teflon (tradename)" 6-J, "Teflon (tradename)" 6C-J, "Teflon (tradename)" 62-J of Du Pont-Mitsui-Florochemicals, Co. Ltd, "Fluon" CD1, CD076, etc., of Asahi ICI Fluoropolymers Co., Ltd. are commercialized. Furthermore, as commercially available polytetrafluoroethylene-containing mixed powder comprising a polytetrafluoroethylene particles and an organic polymer, by Mitsubishi Rayon Co. Ltd., as "Metablen (tradename)" A series, "Metablen (tradename)" A-3000, "Metablen (tradename)" A-3800, etc., are commercialized. However, since "Teflon (tradename)" 6-J, etc., comprising polytetrafluoroethylene, is apt to agglomerate, when it is mechanically hardly mixed with other resin composition by a Henschel mixer or the like, it often agglomerate to form a mass, and there is a problem in handling or dispersibility which depends on mixing condition. On the other hand, the polytetrafluoroethylene-containing mixed powder comprising a polytetrafluoroethylene particles and an organic polymer is excellent in handling and dispersibility, and especially preferably used. The above-mentioned polytetrafluoroethylene-containing mixed powder comprising a polytetrafluoroethylene particles and an organic polymer is not especially limited, but the polytetrafluoroethylene-containing mixed powder comprising a polytetrafluoroethylene particles and an organic type polymer or the like disclosed in JP-A-2000-226523 is mentioned, and the above-mentioned organic type polymer is an organic type polymer or the like which contains 10 wt % or more of an aromatic vinyl-based monomer, an acrylate-based monomer or vinyl cyanide-based monomer, or may be a mixture of them, and the amount of the polytetrafluoroethylene in the polytetrafluoroethylene-containing mixed powder is preferably 0.1 wt % -90 wt %.

And, a compounding ratio of the fluorine-based resin (G) is 0.01-3 wt parts with respect to 100 wt parts of the total amount of the polylactic acid resin (A) and the aromatic polycarbonate resin (B), preferably, 0.02-2 wt parts is preferable, more preferably, 0.03-1 wt parts is preferable, and if the compounding ratio of the fluorine-based resin exceeds 3 wt parts, flowability or flame retardancy in the present invention falls on the contrary, and if it is less than 0.01 wt parts, the effect of improving flame retardancy is not recognized.

It is preferable that the flame retardant resin composition of the present invention to which the flame retardant is compounded has a flame retardancy of any one of the flame retardancies V-2, V-1 or V-0 of the UL standard with a molded article of 1.6 mm thickness (⅙ inch), or the flame retardancy 5V of the UL standard. Here, the UL standard means a flame retardant resin composition which has a flame retardant property V-2, V-1 or V-0 in the U.S. UL standard, Subject 94 (UL-94 Standard) with a molded article of 1.6 mm thickness (⅙ inch), and further a flame retardant resin composition which also has a flame retardant property 5V while maintaining the above-mentioned property V-2, V-1 or V-0. In an especially preferable embodiment, it is possible to have the property V-1 or V-0 and the property 5V together, and more preferable embodiment is the flame retardant resin composition to which the polylactic acid resin (A), the aromatic polycarbonate resin (B), a compatibilizer selected from the (C), (D) and (E), and the flame retardant (F) are compounded, which can have the properties of V-0 and V-5 together. Furthermore, by using the fluorine-based resin (G) together, since it prevents dripping at flaming, it has an effect of shortening a flaming time.

Here, the flame retardancy of the UL-94 standard is explained. In the test method of the flame retardancy, there are the horizontal test and the vertical test, and a material which clears the horizontal test is classified as flame retardancy rank HB. And, in a vertical test in which a test piece is fixed in a vertical position and a flame is applied at a lower position of the test piece, since the test piece is easier to burn than in a horizontal test, a higher flame retardancy of material is required, and as the rank of flame retardancy, V-2, V-1 and V-0 are provided. The smaller the numeral, the more excellent the flame retardancy, and V-0 is the highest flame retardancy here. Furthermore, materials satisfying the standard of the above-mentioned vertical test, can be subjected to 5V test in which 12.7 cm (5 inches) flame is applied. Since the flame of the vertical test for deciding the above-mentioned V-2, V-1 and V-0 is 1.9 cm (¾ inch), a higher flame retardancy is required. And, the UL-94 Standard is defined according to a thickness of test piece which satisfies the standard of the above-mentioned flame retardant test and a result of the horizontal test or vertical test. As an example, when a material of 1.6 mm (¹⁄₁₆ inch) thickness shows V-0, it is classified as 1.6 mm (¹⁄₁₆ inch) thickness V-0, and furthermore, in case where the material clears also 5V standard, it is classified as 1.6 mm (¹⁄₁₆ inch) thickness V-0 and 1.6 mm (¹⁄₁₆ inch) thickness 5V. Here, in the vertical test for classifying V-2, V-1 and V-0 and in the 5V test, thicknesses of the test piece may be different.

In the present invention, an epoxy compound (H) can be further compounded, and as the epoxy compound (H), both of monofunctional epoxy compound and bifunctional epoxy compound may be used, but an epoxy compound having a glycidyl group is preferable, for example, a glycidyl ester compound, a glycidyl ether compound and a glycidyl ester ether compound are mentioned. These epoxy compounds can be used in one kind or more. The above-mentioned glycidyl ester compound is not limited but, for example, glycidyl benzoate, glycidyl tBu-benzoate, glycidyl p-toluate, glycidyl (cyclohexanecarboxylate), glycidyl pelargonate, glycidyl stearate, glycidyl laurate, glycidyl palmitate, glycidyl behenate, versatic acid glycidyl ester, glycidyl oleate, glycidyl linoleate, glycidyl linolenate, glycidyl behenolate, glycidyl stearolate, diglycidyl terephthalate, diglycidyl isophthalate, diglycidyl phthalate, diglycidyl naphthalene dicarboxylate, diglycidyl bibenzoate, diglycidyl (methyl terephthalate), diglycidyl hexahydrophthalate, diglycidyl tetrahydrophthalate, diglycidyl (cyclohexane dicarboxylate), diglycidyl adipate, diglycidyl succinate, diglycidyl sebacate, dodecane dioic acid diglycidyl ester, diglycidyl (octadecane dicarboxylate), triglycidyl trimellitate and tetraglycidyl pyromellitate or the like are mentioned and these can be used alone or two kinds of them or more together.

And, the above-mentioned glycidyl ether compound is not limited, but as examples, phenyl glycidyl ether, p-phenylphenyl glycidyl ether, 14-bis(β,γ-epoxypropoxy) butane, 1,6-bis (β,γ-epoxypropoxy) hexane, 1,4-bis(β,γ-epoxypropoxy) benzene, 1-(β,γ-epoxypropoxy)-2-ethoxyethane, 1-(β,γ-epoxypropoxy)-2-benzyl oxyethane, 2,2-bis[p-(β,γ-epoxypropoxy) phenyl] propane, and diglycidyl ethers obtainable by reaction of other bisphenols such as bis(4-hydroxyphenyl) methane or the like and epichlorohydrin are mentioned, and these can be used alone or two kinds of them or more together.

And, as the epoxy compound (H) preferably used, an epoxy compound in which a monofunctional glycidyl ester compound and a glycidyl ether compound are used together or a monofunctional glycidyl ester compound, more preferably, the monofunctional glycidyl ester compound is excellent in balance between viscosity stability and hydrolysis resistance of the composition to be obtained.

Furthermore, as for epoxy equivalent of the epoxy compound (H), an epoxy compound of less than 500 is preferable, furthermore, an epoxy compound of its epoxy equivalent is less than 400 is especially preferable. Here, the epoxy equivalent is the number of grams which contains one gram equivalent of epoxy group, and it can be determined by a method in which an epoxy compound is dissolved in pyridine, to which 0.05N hydrochloric acid is added, and after heated at 45° C., by using a mixed liquid of thymol blue and cresol red as indicator, it is subjected to a reverse titration with 0.05 N caustic soda.

Furthermore, the epoxy compound (H) is effective to improve hydrolysis resistance property, without spoiling viscosity stability and mechanical property, and a compounding ratio of the epoxy compound (F) is 0.01-10 wt parts with respect to 100 wt parts of total amount of the polylactic acid resin (A) and the aromatic polycarbonate resin (B) in view of viscosity stability and hydrolysis resistance property, and it is preferably, 0.05-9 wt parts, more preferably, 0.1-8 wt parts. Here, in the above-mentioned epoxy compound (F), the polymer compound to which the glycidyl compound is grafted or copolymerized is not included.

In the present invention, the alkali earth metal compound (I) can be compounded further, as the alkali earth metal compound, alkali earth metal compounds such as magnesium compound, calcium compound and barium compound are preferably mentioned. Furthermore, as the above-mentioned alkali earth metal compound (I), hydroxide, oxide, carbonic acid salt, sulfuric acid salt, organic acid salts such as acetate, lactate, oleic acid, palmitic acid, stearic acid and montanic acid of the alkali earth metal are mentioned. And, as examples of the above-mentioned alkali earth metal compound, calcium hydroxide, barium hydroxide, magnesium oxide, calcium oxide, barium oxide, magnesium carbonate, calcium carbonate, barium carbonate, magnesium sulfate, calcium sulfate, barium sulfate, magnesium acetate, calcium acetate, barium acetate, magnesium lactate, calcium lactate, barium lactate, furthermore magnesium salt, calcium salt and barium salt of organic acids such as of oleic acid, palmitic acid, stearic acid and montanic acid, are mentioned. Among them, a hydroxide and carbonate salt of alkali earth metal are preferably used, especially, magnesium hydroxide and calcium carbonate are preferably used, and more preferably, calcium carbonate is used. These alkali earth metals can be used alone or two kinds or more together. Furthermore, as the above-mentioned calcium carbonate, according to its production method, colloidal calcium carbonate, light calcium carbonate, heavy calcium carbonate, wet milled fine-powdered heavy calcium carbonate, wet type heavy calcium carbonate (chalk) or the like are known, and all of them are included in the present invention. These alkali earth metal compounds may be treated with one kind or more surface treating agents such as a silane coupling agent, an organic substance and an inorganic substance, and their shape may be powdery, plate-like or fibrous, but it is preferable to use them as a powder of average particle diameter of 10 μm or less, in view of dispersibility, etc. If the particle diameter is smaller, it is preferable since the effect of improving hydrolysis resistance property is significant.

Furthermore, as an effect of compounding the alkali earth metal compound (I), although the flame retardant, especially the phosphorus-based flame retardant is easily hydrolyzed and has a bad influence upon hydrolysis resistance property of polylactic acid resin, by adding the alkali earth metal compound together with the epoxy compound, it is estimated that, by neutralizing the phosphoric acid generated from the above-mentioned hydrolyzed phosphorus-based flame retardant with the alkali earth metal compound, the hydrolysis resistance property is improved further. Furthermore, in case where an alkali metal compound is used instead of the alkali earth metal compound, it is not preferable since alkali metal compound is often alkaline and generally accelerate hydrolysis of the polylactic acid resin. The alkali earth metal compound (I) used in the present invention is not easily soluble in neutral condition, and those which dissolves in acidic condition and function to neutralize when a phosphoric acid ester is decomposed and the reaction system is acidified, are preferably used. A solubility in neutral condition is, for example, described in handbooks such as Kagaku-Binran, published by Maruzen (1966), and a solubility in water of 1 g/100 g water or less is preferable, more preferably, $10^{-1}$ g/100 g water or less. For example, calcium carbonate, which is most preferably used, has a solubility in water of $5.2 \times 10^{-3}$ g/100 g water.

Furthermore, the compounding ratio of the alkali earth metal compound (I) is, in view of mechanical property and hydrolysis resistance property, 0.01-10 wt parts with respect to 100 wt parts of the total amount of the polylactic acid resin (A) and the aromatic polycarbonate resin (B), preferably, 0.05-9 wt parts, more preferably, 0.1-8 wt parts.

In the present invention, it is possible to further compound the thermoplastic resin (J), a resin other than those including the polylactic acid resin (A), the aromatic polycarbonate resin (B) and the components (C), (D) and (E), and as examples of the thermoplastic resin (G), a polyester resin, a phenoxy resin, a cellulose ester resin, a polyamide resin, a polyether imide resin, a styrene-based resin, a styrene-based resin elastomer, a silicone compound-containing core-shell rubber, an ionomer resin, a polyphenylene ether resin, a polyphenyl sulfide resin, a phenol resin or the like are mentioned, and a polyester resin, a cellulose ester resin, a polyamide resin, a styrene-based resin, a silicone compound-containing core-shell rubber are especially preferably used.

Here, the compounding ratio of the above-mentioned thermoplastic resin (J) is 0.5-200 wt parts with respect to 100 wt parts of the total amount of the polylactic acid resin (A) and the polycarbonate resin (B), and further, 1-150 wt parts is preferable, and used one kind or more.

As the polyester resin preferably used in the above-mentioned thermoplastic resin (J), (i) a dicarboxylic and its ester formable derivative or a diol and its ester formable derivative, (ii) a hydroxycarboxylic acid and its ester formable derivative, (iii) a polymer or a copolymer obtainable by condensation polymerization of one kind or more selected from lactones, which is a thermoplastic polyester resin other than the polylactic acid resin.

As the above-mentioned dicarboxylic acid or its ester formable derivative, aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl) methane, anthracene dicarboxylic acid, 4,4'-diphenyl ether dicarboxylic acid, 5-tetrabutyl phosphonium isophthalic acid, 5-sodium sulfoisophthalic acid or the like, aliphatic dicarboxylic acids such as oxalic acid, succinic acid, adipic acid, sebacic acid, azelaic acid, dodecane dioic acid, malonic acid, glutaric acid, dimer acid or the like and alicyclic dicarboxylic acid units such as 1,3-cyclohexane dicarboxylic acid, 1,4-cyclohexane dicarboxylic acid and their ester formable derivative or the like are mentioned.

Furthermore, as the above-mentioned diol or its ester formable derivative, aliphatic glycols with 2-20 carbons, namely, ethylene glycol, propylene glycol, 1,4-butanediol, neopentyl glycol, 1,5-pentane diol, 1,6-hexane diol, decamethylene glycol, cyclohexane dimethanol, cyclohexane diol, a dimer diol or the like, or long chain glycols of its molecular weight 200-100,000, namely, polyethylene glycol, poly-1,3-propylene glycol, polytetramethylene glycol or the like, aromatic dioxy compounds, namely, 4,4'-dihydroxybiphenyl, hydroquinone, t-butylhydroquinone, bisphenol A, bisphenol S, bisphenol F or the like, and their ester formable derivatives, etc., can be mentioned.

Furthermore, as the above-mentioned hydroxycarboxylic acid, glycolic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid and their ester formable derivatives, or the like are mentioned. As the above-mentioned lactone, caprolactone, valerolactone, propiolactone, undecalactone, 1,5-oxepan-2-one or the like can be mentioned. As concrete example of these polymer or copolymer, aromatic polyesters such as polybutylene terephthalate, polybutylene (terephthalate/isophthalate), polypropylene terephthalate, polypropylene (terephthalate/isophthalate), polyethylene terephthalate, polyethylene (terephthalate/isophthalate), bisphenol A (terephthalate/isophthalate), polybutylene naphthalate, polybutylene (terephthalate/naphthalate), polypropylene naphthalate, polypropylene (terephthalate/naphthalate), polyethylene naphthalate, polycyclohexane dimethylene terephthalate, polycyclohexane dimethylene (terephthalate/isophthalate), poly(cyclohexane dimethylene/ethylene) terephthalate, poly (cyclohexane dimethylene/ethylene) terephthalate, poly(cyclohexane dimethylene/ethylene) (terephthalate/isophthalate), polybutylene (terephthalate/isophthalate)/bisphenol A, polyethylene (terephthalate/isophthalate)/bisphenol A; copolymers in which a polyether or an aliphatic polyester is copolymerized with an aromatic polyester, such as polybutylene (terephthalate/succinate), polypropylene (terephthalate/succinate), polyethylene (terephthalate/succinate), polybutylene (terephthalate/adipate), polypropylene (terephthalate/adipate), polyethylene (terephthalate/adipate), polyethylene (terephthalate/sulfoisophthalate/adipate), polyethylene (terephthalate/sulfoisophthalate/succinate), polypropylene (terephthalate/sulfoisophthalate/succinate), polybutylene (terephthalate/sebacate), polypropylene (terephthalate/sebacate), polyethylene (terephthalate/sebacate), polybutylene terephthalate.polyethylene glycol, polypropylene terephthalate.polyethylene glycol, polyethylene terephthalate.polyethylene glycol, polybutylene terephthalate.poly(tetramethylene oxide) glycol, polypropylene terephthalate.poly (tetramethylene oxide) glycol, polybutylene (terephthalate/isophthalate).poly(tetramethylene oxide) glycol, polypropylene (terephthalate/isophthalate).poly(tetramethylene oxide) glycol, polybutylene terephthalate.poly(propylene oxide/ethylene oxide) glycol, polypropylene terephthalate.poly(propylene oxide/ethylene oxide) glycol, polybutylene (terephthalate/isophthalate).poly(propylene oxide/ethylene oxide) glycol, polypropylene (terephthalate/isophthalate).poly(propylene oxide/ethylene oxide) glycol, polybutylene (terephthalate/adipate), polypropylene (terephthalate/adipate), polybutylene terephthalate.poly ε-caprolactone; aliphatic polyesters such as polyethylene oxalate, polypropylene oxalate, polybutylene oxalate, polyneopentyl glycol oxalate, polyethylene succinate, polypropylene succinate, polybutylene succinate, polybutylene adipate, polypropylene adipate, polyethylene adipate, polybutylene (succinate/adipate), polypropylene (succinate/adipate), polyethylene (succinate/adipate), polyhydroxyalkanoates such as copolymer of polyhydroxybutyric acid and β-hydroxybutyric acid with β-hydroxyvaleric acid, polycaprolactone and polyglycolic acid; aliphatic polyester carbonates such as polybutylene succinate.carbonate; liquid crystal polyesters such as the copolymerized polyesters, e.g., p-oxybenzoic acid/polyethylene terephthalate, p-oxybenzoic acid/6-oxy-2-naphthoic acid; can be mentioned.

Among them, polymers obtainable by condensation polymerization of an aromatic dicarboxylic acid or its ester formable derivative with an aliphatic diol or its ester formable derivative as main components are preferable, and concretely, polybutylene terephthalate, polypropylene terephthalate, polyethylene terephthalate, poly(cyclohexane dimethylene/ethylene) terephthalate, polypropylene naphthalate, polybutylene naphthalate, polybutylene (terephthalate/isophthalate), polypropylene (terephthalate/isophthalate), polyethylene (terephthalate/isophthalate), polybutylene terephthalate.polyethylene glycol, polypropylene terephthalate polyethylene glycol, polyethylene terephthalate.polyethylene glycol, polybutylene terephthalate.poly(tetramethylene oxide) glycol, polypropylene terephthalate-poly (tetramethylene oxide) glycol, polyethylene terephthalate poly(tetramethylene oxide) glycol, polybutylene (terephthalate/isophthalate) poly(tetramethylene oxide) glycol, polypropylene (terephthalate/isophthalate).poly(tetramethylene oxide) glycol, polybutylene (terephthalate/adipate), polypropylene (terephthalate/adipate), polyethylene (terephthalate/adipate), polybutylene (terephthalate/succinate), polypropylene (terephthalate/succinate), polyethylene (terephthalate/succinate), can preferably be mentioned. It is more preferable that the ratio of the aromatic dicarboxylic acid or its ester formable derivative to the total dicarboxylic acid in the polymer obtainable by condensation polymerization of an aromatic dicarboxylic acid or its ester formable derivative with an aliphatic diol or its ester formable derivative as main components is 30 mol % or more, and 40 mol % or more is especially preferable.

Furthermore, among these, polymers obtainable by condensation polymerization of terephthalic acid or its ester formable derivatives with an aliphatic diol selected from ethylene glycol, propylene glycol and butanediol or their ester formable derivatives as main components, are more preferable, and concretely, polypropylene terephthalate, polybutylene terephthalate, polybutylene (terephthalate/isophthalate), polypropylene (terephthalate/isophthalate), polyethylene terephthalate polyethylene glycol, polypropylene terephthalate.polyethylene glycol, polybutylene terephthalate polyethylene glycol, polyethylene terephthalate.poly(tetramethylene oxide) glycol, polypropylene terephthalate.poly(tetramethylene oxide) glycol, polybutylene terephthalate.poly(tetramethylene oxide) glycol, polyethylene terephthalate/isophthalate.poly(tetramethylene oxide) glycol, polypropylene (terephthalate/isophthalate).poly(tetramethylene oxide) glycol, polybutylene (terephthalate/isophthalate).poly(tetramethylene oxide) glycol, polyethylene (terephthalate/succinate), polyethylene (terephthalate/adipate), polypropylene (terephthalate/succinate), polypropylene (terephthalate/adipate), polybutylene (terephthalate/succinate), polybutylene (terephthalate/adipate), can preferably be mentioned. It is more preferable that the ratio of the terephthalic acid or its ester formable derivative to the total dicarboxylic acid is 30 mol % or more in the polymer obtainable by condensation polymerization of the above-mentioned terephthalic acid or its ester formable derivative with butane diol or its ester formable derivative as main components, and 40 mol % or more is especially preferable.

As preferable examples of the above-mentioned polyester resin, polyethylene terephthalate, polybutylene terephthalate, polybutylene (terephthalate/isophthalate), polybutylene (terephthalate/adipate), polyethylene (terephthalate/succinate), polybutylene (terephthalate/succinate), polyester elastomer, polypropylene terephthalate, polybutylene terephthalate.poly(tetramethylene oxide) glycol and polybutylene succinate can be mentioned, and as especially preferable examples, at least one kind selected from polybutylene terephthalate, polypropylene terephthalate, polybutylene terephthalate.poly(tetramethylene oxide) glycol, polyethylene (terephthalate/succinate) and polybutylene succinate, can be mentioned, and they may be used alone or as a mixture of two kinds or more. By compounding the polyester resin, a resin composition and a molded article in which one or more of flame retardancy, moldability, heat resistance and mechanical property are improved, can be obtained.

The cellulose resin in the present invention means those of which hydroxyl groups are blocked by an esterifying agent. Concretely, as the esterifying agent, acid chloride such as acetyl chloride and propionyl chloride, acid anhydrides such as acetic anhydride, propionic anhydride and lactic anhydride, carboxylic acid compound derivatives such as an amide compound and an ester compound, and cyclic esters such as E-caprolactone, are mentioned.

As the cellulose ester resin used in the present invention, cellulose acetate, cellulose diacetate cellulose triacetate, cellulose acetate propionate, cellulose acetate butylate and cellulose acetate phthalate or the like are mentioned, and in view of compatibility or ability to be mixed with the polylactic acid resin (A), cellulose diacetate, cellulose triacetate, cellulose acetate propionate, cellulose acetate butylate and cellulose acetate phthalate are preferable, and further, cellulose triacetate and cellulose acetate propionate are more preferable. In addition, it is preferable that a degree of substitution of hydroxyl group in the cellulose (average number of hydroxyl group substituted with cellulose ester) is 0.5-2.9 with respect to glucose unit. Furthermore, in view of compatibility or ability to be mixed with the polylactic acid resin (A), it is preferable that the degree of substitution is 1.5-2.9, and 2.0-2.8 is more preferable. Here, the above-mentioned degree of substitution can be determined by a quantitative analysis by feeding the esterifying agent generated by alkali hydrolysis to a high speed liquid chromatography.

The polyamide resin in the present invention is a thermoplastic polymer having an amide bond of which starting materials are an amino acid, lactam or diamine and a dicarboxylic acid.

As the amino acid, 6-aminocaproic acid, 11-aminoundecanoic acid, 12-aminododecanoic acid, p-aminomethyl benzoic acid or the like are mentioned, and as the lactam, ε-caprolactam, ω-laurolactam or the like are mentioned.

As the diamine, tetramethylene diamine, hexamethylene diamine, undecamethylene diamine, dodecamethylene diamine, 2,2,4-trimethyl hexamethylene diamine, 2,4,4-trimethyl hexamethylene diamine, 5-methyl nonamethylene diamine, 2,4-dimethyl octamethylene diamine, m-xylylene diamine, p-xylylene diamine, 1,3-bis(aminomethyl)cyclohexane, 1-amino-3-aminomethyl-3,5,5-trimethyl cyclohexane, 3,8-bis(aminomethyl) tricyclodecane, bis(4-aminocyclohexyl) methane, bis(3-methyl-4-aminocyclohexyl) methane, 2,2-bis(4-aminocyclohexyl) propane, bis(aminopropyl) piperazine, aminoethyl piperazine or the like are mentioned.

As the dicarboxylic acid, adipic acid, suberic acid, azelaic acid, sebacic acid, dodecane dioic acid, terephthalic acid, isophthalic acid, naphthalene dicarboxylic acid, 2-chloroterephthalic acid, 2-methyl terephthalic acid, 5-methyl isophthalic acid, 5-sodium sulfoisophthalic acid, hexahydroterephthalic acid, hexahydroisophthalic acid, diglycolic acid or the like are mentioned.

As a preferable polyamide used in the present invention, polycaproamide (Nylon 6), polytetramethylene adipamide (Nylon 46), polyhexamethylene adipamide (Nylon 66), polyhexamethylene sebacamide (Nylon 6/10), polyhexamethylene dodecamide (Nylon 6/12), polyundecamethylene adipamide (Nylon 11/6), polyundecane amide (Nylon 11), polydodecane amide (Nylon 12), polytrimethyl hexamethylene terephthalamide, polyhexamethylene isophthalamide (Nylon 61), polyhexamethylene terephthal/isophthalamide (Nylon 6T/61), polybis (4-aminocyclohexyl) methane dodecamide (Nylon PACM12), polybis (3-methyl-4-aminocyclohexyl) methane dodecamide (Nylon dimethyl PACM12), polymetaxylylene adipamide (Nylon MXD6), polyundecamethylene terephthalamide (Nylon 11T), polyundecamethylene hexahydroterephthalamide (Nylon 11T(H)) and their copolymerized polyamide with polyalkylene glycol or the like, mixed polyamide, polyamide elastomer or the like, are mentioned. Among them, Nylon 6, Nylon 66, Nylon 11, Nylon 12, Nylon 6/10, Nylon 6/12, Nylon 11/6 and their copolymerized polyamide with polyethylene glycol or the like, mixed polyamide and polyamide elastomer are preferable, and Nylon 6, Nylon 11, Nylon 12, Nylon 6/polyethylene glycol and polyamide elastomer are more preferable, and Nylon 6 and Nylon 6/polyethylene glycol are especially preferable.

Furthermore, in view of heat stability of the polylactic acid resin (A) and the polycarbonate resin (B), it is preferable that a melting point of the polyamide resin used is 90° C. or higher and 240° C. or lower, and it is more preferable to be 100° C. or higher and 230° C. or lower.

The above-mentioned polyamide resins may be used alone or may also be used as a mixture of two kinds or more.

In the present invention, by compounding the polyamide resin, a resin composition and a molded article in which moldability, mechanical property and heat resistance of the resin composition of the present invention are improved, can be obtained.

The styrene-based resin in the present invention is a styrene-based resin other than the styrene-based elastomer of the above-mentioned component (C), and as components contained other than styrene, α-methylstyrene, vinyl toluene, aromatic vinyl compounds such as divinyl benzene, vinyl cyanide compounds such as acrylonitrile, alkyl (meth)acrylates such as methyl methacrylate, ethyl methacrylate, n-butyl methacrylate, methyl acrylate, ethyl acrylate, n-butyl acrylate and stearyl acrylate, maleimide-based monomers such as maleimide, N-methyl maleimide, N-ethyl maleimide, N-phenyl maleimide, N-cyclohexyl maleimide, diene compound, dialkyl maleate, allyl alkyl ether, unsaturated amino compound, vinyl alkyl ether or the like, may further be copolymerized, and as examples of the styrene-based resin containing styrene, although not limited thereto, polystyrene resin, impact resistance polystyrene resin (high impact polystyrene resin), acrylonitrile/styrene copolymer (hereunder, abbreviated as AS resin), ABS resin, acrylate/styrene/acrylonitrile copolymer (AAS resin), acrylonitrile/ethylene/styrene (AES resin) or the like, are mentioned, and especially AS resin is preferably used.

Regarding an amount of styrene and acrylonitrile as main components in the above-mentioned preferably used AS resin, they preferably are copolymerized at least 70 wt % or more, and regarding the copolymerization ratio of styrene and acrylonitrile, an amount of acrylonitrile of 10 wt % or more and less than 50 wt % is preferable, and an amount of acrylonitrile of 20 wt % or more and less than 40 wt % is more preferable. In case where an amount of acrylonitrile is in a proper range, especially in case where a phosphorus-based flame retardant is used, it is possible to obtain a resin composition and a molded article excellent in bleed resistance.

As example of the silicone compound containing core-shell rubber used in the present invention, a silicone-acryl composite core-shell rubber can be mentioned.

In the present invention, a fibrous reinforcing material can be further compounded, and it is possible to try to raise heat resistance, especially thermal distortion temperature.

As the fibrous reinforcing material used in the present invention, it is possible to use those which is generally used for reinforcement of thermoplastic resins. Concretely, inorganic fibrous reinforcing materials such as glass fiber, asbestos fiber, carbon fiber, graphite fiber, metal fiber, potassium titanate whisker, aluminum borate whisker, magnesium-based whisker, silicon-based whisker, sepiolite, asbestos, slug fiber, zonolite, ellestadite, plaster fiber, silica fiber, silica.alumina fiber, zirconia fiber, boron nitride fiber, silicon nitride fiber and boron fiber, organic fibrous reinforcing materials such as polyester fiber, Nylon fiber, acrylic fiber, regenerated cellulose fiber, acetate fiber, kenaf, rammie, cotton, jute, hemp, sisal, flax, linen, silk, Manila jute, sugar cane, wood pulp, waste paper, used paper and wool are mentioned and among these reinforcing fibers, inorganic fibrous reinforcing materials are preferable, especially, glass fiber or aluminum borate whisker is preferable. Furthermore, it is also preferable to use an organic fibrous reinforcing material, and for making advantage of biodegradability of the polylactic acid resin, natural fibers or re-generated fibers are more preferable, especially, kenaf is preferable. And, it is preferable that an aspect ratio (average fiber length/average fiber diameter) of the fibrous reinforcing material to be compounded is 5 or more, more preferably, 10 or more, and still more preferably, 20 or more.

The above-mentioned fibrous reinforcing material may be subjected to a coating or sizing treatment with a thermoplastic resin such as an ethylene/vinyl acetate copolymer or with a thermosetting resin such as an epoxy resin, and may also be treated with a coupling agent such as an aminosilane or an epoxy silane.

In addition, it is preferable that a compounding ratio of the fibrous reinforcing material is 0.1-200 wt parts with respect to 100 wt parts of the total amount of the polylactic acid resin (A) and the aromatic polycarbonate resin (B), and 0.5-100 wt parts is more preferable.

In the present invention, a plasticizer can further be compounded, and as the plasticizer, publickly known ones generally used as a plasticizer of polymer can be used without a specific limitation, for example, a polyester-based plasticizer, a glycerin-based plasticizer, a multivalent carboxylic acid ester-based plasticizer, a polyalkylene glycol-based plasticizer, an epoxy-based plasticizer or the like can be mentioned.

As examples of the polyester-based plasticizer, polyesters obtainable from an acid component such as adipic acid, sebacic acid, terephthalic acid, isophthalic acid, naphthalene dicarboxylic acid, diphenyl dicarboxylic acid and a rosin, and a diol component such as propylene glycol, 1,3-butanediol, 1,4-butanediol, 1,6-hexane diol, ethylene glycol and diethylene glycol, or polyesters obtainable from a hydroxycarboxylic acid such as polycaprolactone, or the like, can be mentioned. These polyesters may be end-capped with a monofunctional carboxylic acid or by a mono-functional alcohol, or may be end-capped with an epoxy compound or the like.

As examples of the glycerin-based plasticizer, glycerin monoacetmonolaurate, glycerin diacetmonolaurate, glycerin monoacetmonostearate, glycerin diacetmonooleate and glycerin monoacetmonomontanate or the like can be mentioned.

As examples of multivalent carboxylic acid-based plasticizer, phthalic acid esters such as dimethyl phthalate, diethyl phthalate, dibutyl phthalate, dioctyl phthalate, diheptyl phthalate, dibenzyl phthalate and butyl benzyl phthalate, trimellitic acid esters such as tributyl trimellitate, trioctyl trimellitate and trihexyl trimellitate, adipic acid esters such as diisodecyl adipate, n-octyl-n-decyl adipate, methyl diglycol butyl diglycol adipate, benzyl methyl diglycol adipate and benzyl butyl diglycol adipate, citric acid esters such as triethyl acetyl citrate and tributyl acetyl citrate, azelaic acid esters such as di-2-ethyl hexyl azelate, sebacic acid esters such as dibutyl sebacate and di-2-ethyl hexyl sebacate, or the like, can be mentioned.

As examples of the polyalkylene glycol-based plasticizer, polyalkylene glycols such as polyethylene glycol, polypropylene glycol, poly(ethylene oxide.propylene oxide) block and/or random copolymer, polytetramethylene glycol, ethylene oxide additive polymer of bisphenols, propylene oxide additive polymer of bisphenols, tetrahydrofuran additive polymer of bisphenols, or their end group capped compounds such as an end group epoxy modified compound, an end group ester modified compound and an end group ether modified compound, can be mentioned.

Epoxy-based plasticizer generally means epoxy triglyceride obtainable from an epoxy alkyl stearate and soybean oil, but other than that, so-called epoxy resin such as of which main starting materials are bisphenol A and epichlorohydrin, can be used.

As examples of the other plasticizer, benzoic acid esters of aliphatic polyol such as neopentyl glycol dibenzoate, diethylene glycol dibenzoate, triethylene glycol di-2-ethyl butylate, fatty acid amides such as stearic acid amide, aliphatic carboxylic acid esters such as butyl oleate, oxy acid esters such as methyl (acetyl ricinoleate), butyl (acetylricinoleate), pentaerythritol, polyacrylate and paraffins or the like can be mentioned. As the plasticizer used in the present invention, among the exemplified above, especially, at least one kind selected from the polyester-based plasticizer and the polyalkylene glycol-based plasticizer is preferable, and two kinds or more may be used together.

And, regarding the compounding ratio of the plasticizer, it is preferable to be in the range of 30-0.01 wt parts with respect to 100 wt parts of the total amount of the polylactic acid resin (A) and the aromatic polycarbonate resin (B), the range of 20-0.1 wt parts is more preferable, and the range of 10-0.5 wt parts is especially preferable.

In the present invention, by compounding the plasticizer, moldability and heat resistance are improved and it is preferable.

In the present invention, it is possible to further compound a crystal nucleating agent, and as the crystal nucleating agent, inorganic-based nucleating agents such as a nitride, organic-based nucleating agents such as a metal salt of organic carboxylic acid, sorbitols, high molecular weight nucleating agents of which melting point are higher than that of the polylactic acid resin (A), or the like are mentioned, and it may be one kind only, or two kinds or more may also be used together.

And, it is preferable that the compounding ratio of the crystal nucleating agent is preferably 0.01-30 wt parts with respect to 100 wt parts of the total amount of the polylactic acid resin (A) and the aromatic polycarbonate resin (B), 0.05-20 wt parts is more preferable, and 0.1-10 wt parts is especially preferable. In the present invention, by compounding the crystal nucleating agent, moldability and heat resistance are improved and it is preferable. In the present invention, the plasticizer and the crystal nucleating agent may respectively be used alone, but it is preferable to use both of them together in view of moldability.

In the present invention, it is possible to further compound a layer silicate, and improvement of moldability thereby is possible. Furthermore, it is more preferable to compound a layer silicate of which cation exchangeable ion present in the interlayer is exchanged with an organic onium ion. The layer silicate of which exchangeable cation present in the interlayer is exchanged with organic onium ion in the present invention is an inclusion compound in which exchangeable cation of the layer silicate which has an exchangeable cation in its interlayer is exchanged with an organic onium ion.

The layer silicate having an exchangeable cation in its interlayer has a structure in which plate-like substances of 0.05-0.5 μm width and 6-15 angstroms thickness are laminated, and has an exchangeable cation in the interlayers of the plat-like substances. Regarding the cation exchangeable capacity, 0.2-3 meq/g is mentioned, and preferably cation exchangeable capacity is 0.8-1.5 meq/g.

Furthermore, as examples of the layer silicate, smectite-based clay minerals such as montmorillonite, beidellite, nontronite, saponite, hectorite, sauuconite, various clay minerals such as vermiculite, halloysite, kanemite, kenyait, zirconium phosphate, titanium phosphate, swellable micas such as Li-type fluorine teniolite, Na-type fluorine taeniolite, Na-type tetrasilicic fluorine mica, Li-type tetrasilisic fluorine mica, or the like, are mentioned, and they may be natural or synthetic. Among them, smectite-based clay minerals such as montmorillonite and hectorite or swellable synthetic micas such as Na-type tetra silicon fluorine mica and Li-type fluorine teniolite or the like, are preferable.

And, as organic onium ion, ammonium ion or phosphonium ion, sulfonium ion or the like are mentioned. Among them, ammonium ion and phosphonium ion are preferable, and in particular, ammonium ion is preferably used. As the ammonium ions, any one of primary ammoniums, secondary ammoniums, tertiary ammoniums and quaternary ammoniums can be used, and as the primary ammonium ion, decyl ammonium, dodecyl ammonium, octadecyl ammonium, oleyl ammonium, benzyl ammonium or the like are mentioned, as the secondary ammonium ion, methyl dodecyl ammonium, methyl octadecyl ammonium or the like are mentioned, as the tertiary ammonium ion, dimethyl dodecyl ammonium, dimethyl octadecyl ammonium or the like are mentioned and as the quaternary ammonium ion, benzyl trialkyl ammonium ions such as benzyl trimethyl ammonium, benzyl triethyl ammonium, benzyl tributyl ammonium, benzyl dimethyl dodecyl ammonium, benzyl dimethyl octadecyl ammonium and benzalkonium, alkyl trimethyl ammonium ions such as trimethyl octyl ammonium, trimethyl dodecyl ammonium and trimethyl octadecyl ammonium, dimethyl dialkyl ammonium ions such as dimethyl dioctyl ammonium, dimethyl didodecyl ammonium and dimethyl dioctadecyl ammonium, trialkyl methyl ammonium ions such as trioctyl methyl ammonium and tridodecyl methyl ammonium, a benzethonium ion having two benzene rings, or the like, are mentioned. And, other than the above, aniline, p-phenylene diamine, α-naphthyl amine, p-aminodimethyl aniline, benzidine, pyridine, piperidine, 6-aminocaproic acid, 11-aminoundecanoic acid, 12-aminododecanoic acid, an ammonium ion derived from polyalkylene glycol having an amino group at its molecular end, or the like are mentioned. Among these ammonium ions, as preferable compounds, trioctyl methyl ammonium, benzyl dimethyl dodecyl ammonium, benzyl dimethyl octadecyl ammonium, benzalkonium, or the like are mentioned. These ammonium ions are generally available as mixtures, and the names of the above-mentioned compound are those of representative compound including a small amount of analogues. These can be used alone or can be used as a mixture of two kinds or more.

And those having a reactive functional group or those excellent in compatibility are preferable, and 12-aminododecanoic acid and an ammonium ion derived from polyalkylene glycol having an amino group at its molecular end, or the like are also preferable.

The layer silicate used in the present invention of which exchangeable cation is exchanged with an organic onium ion present in the interlayer can be produced by reacting a layer silicate having an exchangeable cation in its interlayer with an organic onium ion by a publickly know method. Concretely, a method by ion exchange in a polar solvent such as water, methanol or ethanol, a method of directly reacting a layer silicate with a liquid or melted ammonium salt, or the like are mentioned.

In the present invention, the amount of the organic onium ion to the layer silicate is, in view of dispersibility, thermal stability at melting, prevention of a gas or odor at molding, of the layer silicate, generally in the range of 0.4-2.0 equivalent to the cation exchangeable capacity of the layer silicate, but the range of 0.8-1.2 equivalent is preferable.

Furthermore, it is preferable to use these layer silicates, after pretreating with a coupling agent having a reactive functional group, in addition to the above-mentioned organic onium salt, for obtaining better mechanical strength. As coupling agents having these reactive functional groups, an isocyanate-based compound, an organic silane-based compound, an organic titanate-based compound, an organic borane-based compound and an epoxy compound or the like are mentioned.

In the present invention, compounding ratio of the layer silicate is preferably to be 0.1-40 wt parts with respect to 100 wt parts of the total amount of the polylactic acid resin (A) and the polycarbonate resin (B), 0.5-30 wt parts is more preferable and 1-20 wt parts is especially preferable.

In the present invention, by further compounding one or more kinds of carbon black, titanium oxide, red iron oxide, ultramarine blue, calcined yellow and further various pigments or dyes, it is possible to color the resin into various colors, or to improve weather (light) resistance and electric conductivity, and the compounding ratio of the pigment or dye is 0.01-10 wt parts with respect to 100 wt parts of the total amount of the polylactic acid resin (A) and the aromatic polycarbonate resin (B), preferably, 0.02-9 wt parts, more preferably, 0.03-8 wt parts.

And, the above-mentioned carbon black is not especially limited, but channel black, furnace black, acetylene black, anthracene black, oil black, charcoal black, graphite or the like are mentioned, and a carbon black of average particle diameter of 500 nm or less, dibutyl phthalate oil absorbability of 50-400 $cm^3/100$ g is preferably used, and it may be treated with aluminum oxide, silicon oxide, zinc oxide, zirconium oxide, polyol, silane coupling agent or the like as a treating agent.

And, as the above-mentioned titanium oxide, a titanium oxide which has a crystalline structure such as rutile type or anatase type and an average particle diameter of 5 μm or less is preferably used, and it may be treated with aluminum oxide, silicon oxide, zinc oxide, zirconium oxide, polyol, silane coupling agent or the like, as a treating agent. Furthermore, the above-mentioned carbon black, titanium oxide and various pigments or dyes may be used as a mixed material which is melt blended or simply blended with various thermoplastic resins in order to improve dispersibility or handling at production of the flame retardant resin composition of the present invention. In particular, as the above-mentioned thermoplastic resin, a polyester resin such as polylactic acid resin is preferable, and especially polylactic acid resin is preferably used.

To the resin composition of the present invention, in a range which does not spoil the purpose of the present invention, a stabilizer (a hindered phenol-based antioxidant, a phosphorus-based antioxidant, an amine-based antioxidant, a sulfur-based antioxidant, a light-resistant agent, a UV absorber, a copper inhibitor or the like), a releasing agent (a fatty acid, a fatty acid metal salt, an oxy-fatty acid, a fatty acid ester, a partially saponified aliphatic ester, paraffin, a low molecular weight polyolefin, a fatty acid amide, an alkylene bis fatty acid amide, an aliphatic ketone, a fatty acid ester of low molecular weight alcohol, a fatty acid ester of multivalent alcohol, a fatty acid polyglycols ester and a modified silicone) or the like can be added, as required.

A production method of the resin composition of the present invention is not especially limited, but it is produced by a method in which, for example, the polylactic acid resin (A), the aromatic polycarbonate resin (B), a compatibilizer selected from the (C), (D) and (E), and, as required, other additives such as the flame retardant (F) are blended beforehand, and then melt/kneaded uniformly by using a single screw or twin screw extruder at a temperature higher than the melting point of the polylactic acid resin (A).

The resin composition of the present invention is a resin composition having unique characteristics, and can be used by processing into various product forms by extrusion molding, injection molding, blow molding or spinning into various fibers such as undrawn fiber, drawn fiber or super-drawn fiber, in particular, as molded articles of various applications such as mechanical structural parts, electrical-electronic parts, auto parts, optical devices, construction parts and daily necessities, and in particular, preferably used as molded articles of mechanical structural parts, electricelectronic parts and auto parts.

As extrusion molded articles obtainable by the above-mentioned extrusion molding, extrusion molded articles such as film, inflation film, sheet, tube, and rod of various shapes, are mentioned, and they can be used by being drawn, and can be used by being further processed into molded articles of various applications such as mechanical structural parts, electric.electronic parts, auto parts, optical devices, construction parts and daily necessities. And, as the mechanical structural parts of the injection molded articles obtainable by injection molding, tools for washing, various bearings such as oil-less bearing, stern bearing and water bearing, motor parts, lighter and type writer or the like can be mentioned. And as electrical.electronic parts of injection molded article, housings of electric equipment, housings OA equipment such as printer, personal computer, note-type personal computer, copy machine and telephone, and molded articles constituting a part of more of, or their housings of, various covers or housings, various gears, various cases, sensor, LED lamp, connector, socket, resistor, relay case, switch, coil bobbin, condenser, variable condenser case, light pick-up, vibrator, various terminal plates, impedance transformer, breaker, plug, print wiring board, tuner, speaker, microphone, headphone, micro-motor, magnetic head base, power module, semiconductor, liquid crystal, FDD carriage, FDD chassis, motor brush holder, parabolic antenna, CD tray, cartridge, cassette, sorter, AC adopter, charging table, electricity distribution panel, consent cover, VTR parts, TV parts, iron, hair dryer, rice cooker parts, microwave oven parts, audio parts, audio-laser disk-compact disk, illumination parts, refrigerator parts, air conditioner parts, type writer parts, word processor parts, office computer-related parts, telephone-related parts, cellular phone-related parts, facsimile-related parts and copy machine-related parts or the like, can be mentioned. As the auto parts of the injection molded article, molded articles constituting a part of more of precision instrument-related parts, alternator terminal, alternator connector, IC regulator, various valves such as exhaust gas valve, various pipes of fuel-related/exhaust system/inspiration system, air intake nozzle snorkel, intake manifold, fuel pump, engine cooling water joint, carburetor main body, carburetor spacer, exhaust gas sensor, cooling water sensor, oil temperature sensor, brake pad wear sensor, throttle position sensor, crank shaft position sensor, air flow meter, thermostat base of air conditioner, warm air flow control valve for heating, brush holder of radiator motor, water pump impeller, turbine vein, wiper motor-related parts, distributor, starter switch, starter relay, wiper harness of transmission, window washer nozzle, air conditioner panel switch board, coil of fuel-related electromagnetic valve, connector for fuse, horn terminal, insulation plate for electrical parts, step motor rotor, lamp socket, lamp reflector, lamp housing, brake piston, solenoid bobbin, engine oil filter, ignition device case, or the like can be mentioned. As the optical devices of the injection molded article, molded articles constituting a part of more of microscope, binoculars, camera and clock or the like can be mentioned. And, as blow-molded articles, the resin is processed into desired shapes as bellows, boots, bottle and varied diameter pipe/tubes, and can be used as molded articles such as mechanical structural parts, electrical.electronic parts, auto parts, optical devices, construction parts, daily necessities or the like.

EXAMPLES

Hereunder, the present invention is explained in more detail with reference to Examples, but the present invention is not limited thereto.

Here, the respective characteristics in Examples were measured according to the following methods.

(1) Whiteness

By using SM color computer, type SM-3 of Suga Test Instruments Co., Ltd., YI value (Yellow Index) of molded article was measured. Here, YI value is a value preferably used for color evaluation from white color to yellow color standardized on white color, and the greater the YI value is, the closer to yellow, and the smaller the YI value is, the closer to white.

(2) Impact Strength

By using an impact test piece of 3 mm thickness made by an injection molding, Izod impact strength (without notch) was measured according to ASTM D256.

(3) Molded Article Appearance

By a visual inspection of surface appearance of a 80 mm×80 mm×3 mm thickness square plate made by an injection molding, on pearl gloss, surface foliation and generation or degree of flow mark were evaluated by the following standard. Furthermore, this evaluation can also be used as an indication of compatibility of resin composition.

◎: With no pearl gloss, surface foliation and flow mark, fluorescent lamp line in room can be seen clearly.

○: With no pearl gloss, surface foliation and flow mark, but fluorescent lamp line in room is seen unclearly.

Δ: With no pearl gloss and surface foliation, but and a flow mark is observed.

x: A pearl gloss or surface foliation is observed.

xx: Pelletizing was impossible due to the Barus effect at melt/kneading, accordingly, a melted polymer was cooled and crashed to make an injection molding sample.

(4) Flame Retardancy

By using a 127 mm×12.7 mm×0.8 mm (5 inch×½ inch×1/32 inch) test piece prepared by an injection molding, a firing test was carried out according to the vertical firing test prescribed in the U.S. UL Standard, Subject 94 (UL94) to evaluate flame retardancy, and its rank of evaluation was indicated in the order of excellence of flame retardancy, as V-0, V-1, V-2, and those out of the above-mentioned ranks were classified as out of standard. Furthermore, materials evaluated as V-0, V-1 and V-2 were subjected to the 5V test of the same standard, and those which satisfied the standard were determined as an acceptable level.

(5) Observation Method of Dispersed Structure and the Amount of Aromatic Polycarbonate Resin Contained in Polylactic Acid Resin From a pelletized resin, a test piece for a transmission electron microscope was cut out, observed a dispersed structure at a magnification of 10,000 of the transmission electron microscope and took photographs of the observed portions. In the photographs, the polylactic acid resin (A) and the aromatic polycarbonate resin (B) were recognized as white color and black color, respectively. An amount of aromatic polycarbonate resin contained in polylactic acid resin was determined by magnifying the photograph to A-4 size by a copy machine, cutting out and weighing 10 portions of polylactic acid resin, successively, after aromatic polycarbonate resins present in the polylactic acid resin (the above-mentioned 10 portions) were cut out and weighed, calculating the ratio of the aromatic polycarbonate resin contained in the polylactic acid resin by the following equation.

Ratio of aromatic polycarbonate resin in polylactic acid resin (%)=(weight of aromatic polycarbonate resin contained in polylactic acid resin)÷(weight of polylactic acid resin)×100

From the above-mentioned value, a flame retardant resin composition having a phase structure of which aromatic polycarbonate resin ratio in polylactic acid resin is 5% or more was judged as ○ in phase structure. And, a flame retardant resin composition of the ratio of less than 5% was judged as x in phase structure. Furthermore, the resin composition in which the ratio of aromatic polycarbonate resin in polylactic acid resin was 10% or more was judged as ◎.

(6) Surface Impact

Two kinds of circular plates of 40 mm diameter, 1 mm thickness and 2 mm thickness were molded by injection molding, set horizontally to an falling weight impact tester and 5R iron weights were fallen from the above to thereby determine an impact energy from the weight and the height to be fallen.

(7) Hydrolysis Resistance Property

An ASTM No. 1 dumbbell test piece of 3 mm thickness was prepared by an injection molding and was placed in a constant temperature and high humidity oven, "Humidity cabinet" LHL-112 of Tabai Espec. Here, the conditions of temperature, humidity and treating time of the constant temperature and high humidity oven were, 60° C.×95% RH×200 h, and a tensile test was carried out according to ASTM D638 method to determine a tensile strength retention by the following formula as an indication of hydrolysis resistance.

Tensile strength retention (%)=(tensile strength after treatment÷tensile strength before treatment)×100

(8) Heat Distortion Temperature

Heat distortion temperature under 1.82 MPa load was determined according to ASTM D648 method by using a test piece of 3 mm thickness prepared by injection molding.

(9) Flowability

An 80 mm×80 mm×1 mm thickness square plate was injection molded to determine the lowest pressure obtainable the square plate and the pressure was judged as the lowest molding pressure. The higher the lowest molding pressure, the poorer the flowability. Here, in the samples of this example, molding conditions other than the molding pressure were the same.

Examples 1-49 and Comparative Examples 1-23

A poly L-lactic acid resin (A) containing 1.2% D-form having a PMMA equivalent weight average molecular weight of 160,000, an aromatic polycarbonate resin (B), a polymer compound containing an acrylic resin or styrene resin unit as a graft (C), and if necessary, an inorganic filler, a flame retardant, a fluorine-based resin, an epoxy compound, an alkali-earth metal salt, other thermoplastic resin, a reinforcing fiber, a stratified silicate, a plasticizer and other stabilizer were mixed in mixing ratios shown in Tables 1-10, melt/kneaded by a twin-screw extruder of 30 mm diameter under conditions of cylinder temperature 250° C. and number of rotations 150 rpm, taken up from a dice as a melted gut in a strand state, cooled by a cooling bath, and obtained a resin composition pelletized by a strand cutter.

Here, in Tables 1-10, the aromatic polycarbonate resin (B), the polymer compound containing acrylic resin or styrene resin unit by graft or copolymerization (C), the flame retardant (F), the fluorine-based resin (G), the epoxy compound (H), the alkali-earth metal salt (I), other thermoplastic resin (J), the reinforcing fiber (K), the plasticizer (L), the stratified silicate (M), other additives (N) and the inorganic filler mean the following substances. Here, the compounding ratios of the components (C)-(N) and the inorganic filler are those with respect to 100 wt parts of the total amount of the polylactic acid resin (A) and the aromatic polycarbonate resin (B).

B-1: aromatic polycarbonate resin (product of Idemitsu Petrochemical Co., Ltd ., "A-1900")
C-1: poly(ethylene/ethyl acrylate/maleic anhydride)-g-polymethyl methacrylate (product of NOF (Corp.), "Modiper" A-8200).
C-2: ethylene/glycidyl methacrylate-g-polymethyl methacrylate (product of NOF (Corp.), "Modiper" A-4200).
C-3: aromatic polycarbonate resin-g-AS resin (product of NOF (Corp.), "Modiper" C-L430D).
C-4: aromatic polycarbonate resin-g-maleic anhydride/AS resin (product of NOF (Corp.), "Modiper" C-L440-G).
Inorganic filler 1: talc (product of Nippon Talc Co., Ltd., "P-6", average particle diameter of about 4 μm).
Inorganic filler 2: talc (product of Nippon Talc Co., Ltd., "MS-P", average particle diameter of about 12 μm).
F-1: condensed phosphate (product of Daihachi Chemical Industry Co., Ltd., "PX-200").
F-2: triphenyl phosphate (product of Daihachi Chemical Industry Co., Ltd. ,"TPP").
F-3: melamine cyanurate (product of Nissan Chemical Industries, Ltd., "MC-440").
F-4: ammonium polyphosphate (product of Suzuhiro Chemical Co., Ltd., "Firecut" FCP730).
F-5: melamine polyphosphate (product of DSM, "Melapur" 200).
F-6: zinc borate (product of Borax Co., "Firebreak" ZB).
G-1: tetrafluoroethylene (product of Du Pont-Mitsui Fluorochemicals Co., Ltd., "Teflon (trademark)" 6-J).
G-2: acryl modified tetrafluoroethylene (product of Mitsubishi Rayon Co. Ltd., "Metablen (trademark)" A-3800).
H-1: versatic acid glycidyl ester (product of Japan Epoxy Resins Co., Ltd., "Cardura E10").
H-2: bisphenol A diglycidyl ether (product of Japan Epoxy Resins Co., Ltd., "Epicote" 828).
I-1(alkali-earth metal salt): calcium carbonate (product of Dowa Kalfine Co., Ltd., "KSS1000").
J-1: Nylon 6 resin (product of Toray Industries, Inc., "Amilan" CM1010).
J-2: polybutylene (terephthalate/adipate) resin (product of BASF, "Ecoflex").
J-3: silicone•acryl composite core-shell rubber (product of Mitsubishi Rayon Co., Ltd., "Metablen" SX-005).
J-4: polyester elastomer resin (product of Du Pont-Toray Co., Ltd., "Hytrel" 4057).
J-5: AS resin (styrene/acrylonitrile=74/26, product of Toray Industries, Inc.).
J-6: polybutylene terephthalate (product of Toray Industries, Inc., "Toraycon" 1401X31).
J-7: polytrimethylene terephthalate resin (product of SHELL, "Corterra").
J-8: polyethylene (terephthalate/succinate) resin (product of Du Pont, "Biomax").
J-9: Nylon 6/polyethylene glycol resin (Sanyo Chemical Industries, Ltd., "Pellestat").
J-10: polybutylene succinate resin (product of Showa Highpolymer Co., Ltd., "Bionole" 1001).
J-11: polymethyl methacrylate resin (product of Sumitomo Chemical, "Sumipex" LG35).
J-12: polycaprolactone resin (product of Daicel Chemical Industries, Ltd., "Praccel" H7).
J-13: cellulose acetate propionate (product of Eastman Chemical Co., "CAP", degree of acetate substitution 0.1, degree of propionate substitution 2.93).
J-14: ionomer (product of Du Pont-Mitsui Polychemicals Co., Ltd., "Himilan" 1555, alkali metal salt is sodium ion).
J-15: ionomer (product of Du Pont-Mitsui Polychemicals Co., Ltd., "Himilan" 1706, alkali metal salt is zinc ion).
J-16: styrene/ethylene/butadiene/styrene (product of Shell Chemicals Japan, Ltd., "Clayton" 1650).
K-1: chopped strand of glass fiber (product of Nitto Boseki Co., Ltd., CS-3J948).
L-1: ethylene bislauric acid amide (product of NOF (Corp.), "Slipax" L).
L-2: polyethylene•propylene glycol (product of Asahi Denka, "Pluronic" F68).
M-1: organized layersilicate (product of CO-OP Chemical, "MTE").
N-1(hindered phenol-based antioxidant): pentaerythrityl-tetrakis {3-(3,5-t-butyl-4-hydroxyphenyl) propionate} (product of Japan Ciba-Geigy, "Irganox" 1010).

Furthermore, by using the pellet of the obtained resin composition, the characteristics of the above-mentioned item (5) were evaluated. Furthermore, the obtained resin composition was subjected to an injection molding by IS55EPN injection molding machine of Toshiba Machine Co., Ltd. at a cylinder temperature of 240° C. and a mold temperature of 80° C., to thereby obtain various injection molded articles. By using the injection molded articles, various properties were evaluated according to the above-mentioned methods.

Those results are shown in Tables 1-10 together.

[Table 1]

TABLE 1

|  |  | Example | | | | | | | | Comparative example | |
|---|---|---|---|---|---|---|---|---|---|---|---|
|  |  | 1 | 2 | 3 | 4 | 5 | 6 | 7 | 8 | 1 | 2 |
| Polylactic acid (A) | wt % | 50 | 50 | 50 | 50 | 50 | 50 | 50 | 50 | 50 | 100 |
| Aromatic polycarbonate (B) | wt % | 50 | 50 | 50 | 50 | 50 | 50 | 50 | 50 | 50 | — |
| Total amount of components (A) and (B) | wt parts | 100 | 100 | 100 | 100 | 100 | 100 | 100 | 100 | 100 | 100 |
| Component (C) | kind | C-1 | C-2 | C-3 | C-4 | C-1 | C-2 | C-3 | C-4 | — | — |
|  | wt parts | 5 | 5 | 5 | 5 | 2 | 2 | 2 | 2 | — | — |
| Inorganic filler | kind | — | — | — | — | 1 | 1 | 1 | 1 | — | 1 |
|  | wt % | — | — | — | — | 5 | 5 | 5 | 5 | — | 5 |

TABLE 1-continued

|  |  | Example |  |  |  |  |  |  |  | Comparative example |  |
|---|---|---|---|---|---|---|---|---|---|---|---|
|  |  | 1 | 2 | 3 | 4 | 5 | 6 | 7 | 8 | 1 | 2 |
| Phase structure | judgment | ◉ | ◉ | ◉ | ◉ | ◉ | ◉ | ◉ | ◉ | X | — |
| Whiteness | YI value | 3.5 | 3.4 | 3.9 | 3.8 | 3.3 | 3.6 | 2.8 | 3.3 | — | 15 |
| Impact strength | KJ/m$^2$ | 55 | 63 | 53 | 52 | 44 | 42 | 47 | 51 | — | 12 |
| Appearance of molded article | visual judgment | ◉ | ◉ | ◉ | ◉ | ◉ | ◉ | ◉ | ◉ | XX | Δ |
| Flame retardancy | rank of firing | out of standard |  |  |  |  |  |  |  |  |  |

B-1: aromatic polycarbonate resin (product of Idemitsu Petrochemical Co., Ltd., "A-1900")
C-1: poly(ethylene/ethyl acrylate/maleic anhydride)-g-polymethyl methacrylate (product of NOF (Corp.), "Modiper" A-8200).
C-2: ethylene/glycidyl methacrylate-g-polymethyl methacrylate (product of NOF (Corp.), "Modiper" A-4200).
C-3: aromatic polycarbonate resin-g-AS resin (product of NOF (Corp.), "Modiper" C-L430D).
C-4: aromatic polycarbonate resin-g-maleic anhydride/AS resin (product of NOF (Corp.), "Modiper" C-L440-G).
Inorganic filler 1: talc (product of Nippon Talc Co., Ltd., "P-6", average particle diameter of about 4 μm).

[Table 2]

TABLE 2

|  |  | Example |  |  |  |  |  |  |
|---|---|---|---|---|---|---|---|---|
|  |  | 9 | 10 | 11 | 12 | 13 | 14 | 15 |
| Polylactic acid (A) | wt % | 25 | 50 | 75 | 50 | 50 | 50 | 50 |
| Aromatic polycarbonate (B) | wt % | 75 | 50 | 25 | 50 | 50 | 50 | 50 |
| Total amount of components (A) and (B) | wt parts | 100 | 100 | 100 | 100 | 100 | 100 | 100 |
| Component (C) | kind | C-2 | C-2 | C-2 | C-2 | C-2 | C-2 | C-2 |
|  | wt parts | 3 | 3 | 3 | 3 | 3 | 3 | 3 |
| Flame retardant (F) | kind | F-1 | F-1 | F-1 | F-1 | F-2 | F-3 | F-4 |
|  | wt parts | 15 | 15 | 15 | 20 | 20 | 20 | 20 |
| Phase structure | judgment | ◉ | ◉ | ○ | ◉ | ◉ | ◉ | ◉ |
| Molded article appearance | visual judgment | ◉ | ○ | ◉ | ○ | ○ | ○ | ○ |
| Surface impact | J | 11 | 9.0 | 6.5 | 7.5 | 7.0 | 6.0 | 6.0 |
| Flame retardancy | rank of firing | V-2 | V-2 | V-2 | V-0 | V-2 | V-2 | V-2 |
| Flame retardancy, 5V test | judgment | — | — | — | acceptable | — | — | — |

B-1: aromatic polycarbonate resin (product of Idemitsu Petrochemical Co., Ltd., "FN-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").
F-2: triphenyl phosphate (product of Daihachi Chemical Industry Co., Ltd., "TPP").
F-3: melamine cyanurate (product of Nissan Chemical Industries, Ltd., "MC-440").
F-4: ammonium polyphosphate (product of Suzuhiro Chemical Co., Ltd., "Firecut" FCP730).

TABLE 3

|  |  | Example |  |  |  |  |  |  |
|---|---|---|---|---|---|---|---|---|
|  |  | 16 | 17 | 18 | 19 | 20 | 21 | 22 |
| Polylactic acid (A) | wt % | 50 | 50 | 50 | 50 | 50 | 50 | 50 |
| Aromatic polycarbonate (B) | wt % | 50 | 50 | 50 | 50 | 50 | 50 | 50 |
| Total amount of components (A) and (B) | wt parts | 100 | 100 | 100 | 100 | 100 | 100 | 100 |
| Component (C) | kind | C-2 | C-2 | C-1 | C-3 | C-4 | C-2 | C-2 |
|  | wt parts | 3 | 3 | 3 | 3 | 3 | 3 | 3 |
| Flame retardant (F) | kind | F-5 | F-6 | F-1 | F-1 | F-1 | F-1 | F-1 |
|  | wt parts | 20 | 20 | 15 | 15 | 15 | 15 | 15 |
| Inorganic filler | kind | — | — | — | — | — | 1 | 2 |
|  | wt parts | — | — | — | — | — | 5 | 5 |
| Phase structure | judgment | ○ | ○ | ◉ | ◉ | ◉ | ◉ | ◉ |
| Molded article appearance | visual judgment | ○ | ○ | ○ | ○ | ○ | ◉ | ○ |
| Surface impact | J | 5.5 | 5.5 | 9.5 | 8.5 | 9.5 | 10.5 | 9.5 |
| Flame retardancy | rank of firing | V-2 | V-2 | V-2 | V-2 | V-2 | V-2 | V-2 |
| Flame retardancy, 5V test | judgment | — | — | — | — | — | — | — |

B-1: aromatic polycarbonate resin (product of Idemitsu Petrochemical Co., Ltd., "FN-1900").
C-1: poly(ethylene/ethyl acrylate/maleic anhydride)-g-polymethyl methacrylate (product of NOF (Corp.), "Modiper" A-8200).
C-2: ethylene/glycidyl methacrylate-g-polymethyl methacrylate (product of NOF (Corp.), "Modiper" A-4200).
C-3: aromatic polycarbonate resin-g-AS resin (product of NOF (Corp.), "Modiper" C-L430D).

TABLE 3-continued

|  |  | Example |  |  |  |  |  |  |
|---|---|---|---|---|---|---|---|---|
|  |  | 16 | 17 | 18 | 19 | 20 | 21 | 22 |

C-4: aromatic polycarbonate resin-g-maleic anhydride/AS resin (product of NOF Corp.), "Modiper" C-L440-G).
F-1: condensed phosphate (product of Daihachi Chemical Industry Co., Ltd., "PX-200").
F-5: melamine polyphosphate (product of DSM, "Melapur" 200).
F-6: zinc borate (product of Borax Co., "Firebreak" ZB).
Inorganic filler 1: talc (product of Nippon Talc Co., Ltd., "P-6", average particle diameter of about 4 μm).
Inorganic filler 2: talc (product of Nippon Talc Co., Ltd., "MS-P", average particle diameter of about 12 μm).

[Table 4]

TABLE 4

|  |  | Comparative example |  |  |  |  |
|---|---|---|---|---|---|---|
|  |  | 3 | 4 | 5 | 6 | 7 |
| Polylactic acid (A) | wt % | 25 | 50 | 75 | 50 | 50 |
| Aromatic polycarbonate (B) | wt % | 75 | 50 | 25 | 50 | 50 |
| Total amount of components (A) and (B) | wt parts | 100 | 100 | 100 | 100 | 100 |
| Component (C) | kind | — | — | — | C-2 | C-2 |
|  | wt parts | — | — | — | 55 | 3 |
| Flame retardant (F) | kind | F-1 | F-1 | F-1 | F-1 | F-1 |
|  | wt parts | 15 | 15 | 15 | 15 | 15 |
| Phase structure | judgment | X | X | X | X | — |
| Appearance of molded article | visual judgment | X | X | X | X | — |
| Surface impact | J | 0.3 | 0.4 | 0.7 | 26 | — |
| Flame retardancy | rank of firing | V-2 | V-2 | V-2 | Out of standard | — |
| Flame retardancy, 5V test | judgment | — | — | — | — | — |

B-1: aromatic polycarbonate resin (product of Idemitsu Petrochemical Co., Ltd.,, "A-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").

[Table 5]

TABLE 5

|  |  | Comparative example |  |  |  |  |  |  |  |
|---|---|---|---|---|---|---|---|---|---|
|  |  | 8 | 9 | 10 | 11 | 12 | 13 | 14 | 15 |
| Polylactic acid (A) | wt % | 50 | 50 | 50 | 50 | 50 | 50 | 50 | 50 |
| Aromatic polycarbonate (B) | wt % | 50 | 50 | 50 | 50 | 50 | 50 | 50 | 50 |
| Total amount of components (A) and (B) | wt parts | 100 | 100 | 100 | 100 | 100 | 100 | 100 | 100 |
| Component (C) | kind | — | — | — | — | — | — | — | — |
|  | wt parts | — | — | — | — | — | — | — | — |
| Flame retardant (F) | kind | F-1 | F-1 | F-1 | F-1 | F-1 | F-1 | F-1 | F-1 |
|  | wt parts | 15 | 15 | 15 | 15 | 15 | 15 | 15 | 15 |
| Other thermoplastic resin (J) | kind | J-1 | J-2 | J-3 | J-4 | J-5 | J-6 | J-7 | J-8 |
|  | wt parts | 3 | 3 | 3 | 3 | 3 | 3 | 3 | 3 |
| Phase structure | judgment | X | X | X | X | X | X | X | X |
| Molded article appearance | visual judgment | X | X | Δ | X | X | X | X | X |
| Surface impact | J | 0.4 | 0.6 | 1.8 | 1.1 | 0.5 | 0.5 | 0.5 | 0.6 |
| Flame retardancy | rank of firing | V-2 | V-2 | V-2 | V-2 | V-2 | V-2 | V-2 | V-2 |
| Flame retardancy, 5V test | judgment | — | — | — | — | — | — | — | — |

B-1: aromatic polycarbonate resin (product of Idemitsu Petrochemical Co., Ltd., "A-1900")
F-1: condensed phosphate (product of Daihachi Chemical Industry Co., Ltd., "PX-200").
J-1: Nylon 6 resin (product of Toray Industries, Inc., "Amilan" CM1010).
J-2: polybutylene (terephthalate/adipate) resin (product of BASF, "Ecoflex").
J-3: silicone•acryl composite core-shell rubber (product of Mitsubishi Rayon Co., "Metablen" SX-005).
J-4: polyester elastomer resin (product of Du Pont-Toray Co., Ltd., "Hytrel" 4057).
J-5: AS resin (styrene/acrylonitrile = 74/26, product of Toray Industries, Inc.).
J-6: polybutylene terephthalate (product of Toray Industries, Inc., "Toraycon" 1401X31).
J-7: polytrimethylene terephthalate resin (product of SHELL, "Corterra").
J-8: polyethylene (terephthalate/succinate) resin (product of Du Pont, "Biomax").

[Table 6]

TABLE 6

|  |  | Comparative example ||||||||
| --- | --- | --- | --- | --- | --- | --- | --- | --- | --- |
|  |  | 16 | 17 | 18 | 19 | 20 | 21 | 22 | 23 |
| Polylactic acid (A) | wt % | 50 | 50 | 50 | 50 | 50 | 50 | 50 | 50 |
| Aromatic polycarbonate (B) | wt % | 50 | 50 | 50 | 50 | 50 | 50 | 50 | 50 |
| Total amount of components (A) and (B) | wt parts | 100 | 100 | 100 | 100 | 100 | 100 | 100 | 100 |
| Component (C) | kind | — | — | — | — | — | — | — | — |
|  | wt parts | — | — | — | — | — | — | — | — |
| Flame retardant (F) | kind | F-1 | F-1 | F-1 | F-1 | F-1 | F-1 | F-1 | F-1 |
|  | wt parts | 15 | 15 | 15 | 15 | 15 | 15 | 15 | 15 |
| Other thermoplastic resin (J) | kind | J-9 | J-10 | J-11 | J-12 | J-13 | J-14 | J-15 | J-16 |
|  | wt parts | 3 | 3 | 3 | 3 | 3 | 3 | 3 | 3 |
| Phase structure | judgment | X | X | X | X | X | X | X | X |
| Molded article appearance | visual judgment | Δ | Δ | X | X | X | X | X | Δ |
| Surface impact | J | 1.6 | 2.1 | 0.4 | 0.6 | 0.5 | 1.1 | 1.2 | 1.6 |
| Flame retardancy | rank of firing | V-2 | V-2 | V-2 | V-2 | V-2 | V-2 | V-2 | V-2 |
| Flame retardancy, 5V test | judgment | — | — | — | — | — | — | — | — |

B-1: aromatic polycarbonate resin (product of Idemitsu Petrochemical Co., Ltd., "A-1900")
F-1: condensed phosphate (product of Daihachi Chemical Industry Co., Ltd., "PX-200").
J-9: Nylon 6/polyethylene glycol resin (Sanyo Chemical Industries, Ltd., "Pellestat").
J-10: polybutylene succinate resin (product of Showa Highpolymer Co., Ltd., "Bionole" 1001).
J-11: polymethylmethacrylate resin (product of Sumitomo Chemical, "Sumipex" LG35).
J-12: polycaprolactone resin (product of Daicel Chemical Industries, Ltd., "Praccel" H7)
J-13: cellulose acetate propionate (product of Eastman Chemical Co., "CAP", degree of acetate substitution 0.1, degree of propionate substitution 2.93).
J-14: ionomer (product of Du Pont-Mitsui Polychemicals Co., Ltd., "Himilan" 1555).
J-15: ionomer (product of Du Pont-Mitsui Polychemicals Co., Ltd., "Himilan" 1706).
J-16: styrene/ethylene/butadiene/styrene (product of Shell Chemicals Japan, Ltd., "Clayton" 1650).

[Table 7]

TABLE 7

|  |  | Example ||||||||
| --- | --- | --- | --- | --- | --- | --- | --- | --- | --- |
|  |  | 23 | 24 | 25 | 26 | 27 | 28 | 29 | 30 |
| Polylactic acid (A) | wt % | 50 | 50 | 50 | 50 | 50 | 50 | 50 | 50 |
| Aromatic polycarbonate (B) | wt % | 50 | 50 | 50 | 50 | 50 | 50 | 50 | 50 |
| Total amount of components (A) and (B) | wt parts | 100 | 100 | 100 | 100 | 100 | 100 | 100 | 100 |
| Component (C) | kind | C-2 | C-2 | C-2 | C-2 | C-2 | C-2 | C-2 | C-2 |
|  | wt parts | 3 | 3 | 3 | 3 | 3 | 3 | 3 | 3 |
| Flame retardant (F) | kind | F-1 | F-1 | F-1 | F-1 | F-1 | F-1 | F-1 | F-1 |
|  | wt parts | 15 | 15 | 15 | 15 | 15 | 15 | 15 | 15 |
| Other thermoplastic resin (J) | kind | J-1 | J-2 | J-3 | J-4 | J-5 | J-6 | J-7 | J-8 |
|  | wt parts | 3 | 3 | 3 | 3 | 3 | 3 | 3 | 3 |
| Phase structure | judgment | ◎ | ◎ | ◎ | ◎ | ◎ | ◎ | ◎ | ◎ |
| Molded article appearance | visual judgment | ○ | ○ | ○ | ○ | ○ | ○ | ○ | ○ |
| Surface impact | J | 8.0 | 9.5 | 12 | 10 | 8.0 | 9.0 | 9.0 | 9.0 |
| Flame retardancy | rank of firing | V-2 | V-2 | V-2 | V-2 | V-2 | V-2 | V-2 | V-2 |
| Flame retardancy, 5V test | judgment | — | — | — | — | — | — | — | — |
| thermal distortion temperature | °C. | 75 | 72 | 68 | 70 | 75 | 75 | 75 | 75 |

B-1: aromatic polycarbonate resin (product of Idemitsu Petrochemical Co., Ltd., "A-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").
J-1: Nylon 6 resin (product of Toray Industries, Inc., "Amilan" CM1010).
J-2: polybutylene (terephthalate/adipate) resin (product of BASF, "Ecoflex").
J-3: silicone•acryl composite core-shell rubber (product of Mitsubishi Rayon Co., "Metablen" SX-005).
J-4: polyester elastomer resin (product of Du Pont-Toray Co., Ltd., "Hytrel" 4057).
J-5: AS resin (styrene/acrylonitrile = 74/26, product of Toray Industries, Inc.).
J-6: polybutylene terephthalate (product of Toray Industries, Inc., "Toraycon" 1401X31).
J-7: polytrimethylene terephthalate resin (product of SHELL, "Corterra")..
J-8: polyethylene (terephthalate/succinate) resin (product of Du Pont, "Biomax").

[Table 8]

TABLE 8

|  |  | Example ||||||||
|---|---|---|---|---|---|---|---|---|---|
|  |  | 31 | 32 | 33 | 34 | 35 | 36 | 37 | 38 |
| Polylactic acid (A) | wt % | 50 | 50 | 50 | 50 | 50 | 50 | 50 | 50 |
| Aromatic polycarbonate (B) | wt % | 50 | 50 | 50 | 50 | 50 | 50 | 50 | 50 |
| Total amount of components (A) and (B) | wt parts | 100 | 100 | 100 | 100 | 100 | 100 | 100 | 100 |
| Component (C) | kind | C-2 | C-2 | C-2 | C-2 | C-2 | C-2 | C-2 | C-2 |
|  | wt parts | 3 | 3 | 3 | 3 | 3 | 3 | 3 | 3 |
| Flame retardant (F) | kind | F-1 | F-1 | F-1 | F-1 | F-1 | F-1 | F-1 | F-1 |
|  | wt parts | 15 | 15 | 15 | 15 | 15 | 15 | 15 | 15 |
| Other thermoplastic resin (J) | kind | J-9 | J-10 | J-11 | J-12 | J-13 | J-14 | J-15 | J-16 |
|  | wt parts | 3 | 3 | 3 | 3 | 3 | 3 | 3 | 3 |
| Phase structure | judgment | ⊚ | ⊚ | ○ | ○ | ⊚ | ⊚ | ⊚ | ⊚ |
| Molded article appearance | visual judgment | ○ | ○ | ○ | ○ | ○ | ○ | ○ | ○ |
| Surface impact | J | 12 | 13 | 7.5 | 7.0 | 8.5 | 11 | 11 | 12 |
| Flame retardancy | rank of firing | V-2 | V-2 | V-2 | V-2 | V-2 | V-2 | V-2 | V-2 |
| Flame retardancy, 5V test | judgment | — | — | — | — | — | — | — | — |
| Heat distortion temperature | °C. | 71 | 68 | 75 | 75 | 75 | 71 | 71 | 68 |

B-1: aromatic polycarbonate resin (product of Idemitsu Petrochemical Co., Ltd., "A-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").
J-9: Nylon 6/polyethylene glycol resin (Sanyo Chemical Industries, Ltd., "Pellestat").
J-10: polybutylene succinate resin (product of Showa Highpolymer Co., Ltd., "Bionole" 1001).
J-11: polymethyl methacrylate resin (product of Sumitomo Chemical, "Sumipex" LG35).
J-12: polycaprolactone resin (product of Daicel Chemical Industries, Ltd., "Praccel" H7)
J-13: cellulose acetate propionate (product of Eastman Chemical Co., "CAP", degree of acetate substitution 0.1, degree of propionate substitution 2.93).
J-14: ionomer (product of Du Pont-Mitsui Polychemicals Co., Ltd., "Himilan" 1555).
J-15: ionomer (product of Du Pont-Mitsui Polychemicals Co., Ltd., "Himilan" 1706).
J-16: styrene/ethylene/butadiene/styrene (product of Shell Chemicals Japan, Ltd., "Clayton" 1650).

[Table 9]

TABLE 9

|  |  | Example ||||||
|---|---|---|---|---|---|---|---|
|  |  | 39 | 40 | 41 | 42 | 43 | 44 |
| Polylactic acid (A) | wt % | 50 | 50 | 50 | 50 | 50 | 50 |
| Aromatic polycarbonate (B) | wt % | 50 | 50 | 50 | 50 | 50 | 50 |
| Total amount of components (A) and (B) | wt parts | 100 | 100 | 100 | 100 | 100 | 100 |
| Component (C) | kind | C-2 | C-2 | C-2 | C-2 | C-2 | C-2 |
|  | wt parts | 3 | 3 | 3 | 3 | 3 | 3 |
| Flame retardant (F) | kind | F-1 | F-1 | F-1 | F-1 | F-1 | F-1 |
|  | wt parts | 15 | 15 | 15 | 15 | 15 | 15 |
| Fluorine-based resin (G) | kind | G-1 | G-2 | G-1 | G-1 | G-1 | G-1 |
|  | wt parts | 0.3 | 0.3 | 0.3 | 0.3 | 0.3 | 0.3 |
| Epoxy compound (H) | kind | — | — | H-1 | H-2 | H-2 | H-2 |
|  | wt parts | — | — | 0.5 | 0.5 | 0.5 | 0.5 |
| Alkali-earth metal salt (I) | kind | — | — | — | — | I-1 | I-1 |
|  | wt parts | — | — | — | — | 0.2 | 0.2 |
| Hindered phenol antioxidant (N) | kind | — | — | — | — | — | N-1 |
|  | wt parts | — | — | — | — | — | 0.2 |
| Phase structure | judgment | ⊚ | ⊚ | ⊚ | ⊚ | ⊚ | ⊚ |
| Molded article appearance | visual judgment | ○ | ⊚ | ○ | ○ | ○ | ○ |
| Surface impact | J | 10 | 11 | 9.5 | 9.5 | 9.5 | 9.5 |
| Flame retardancy | rank of firing | V-0 | V-0 | V-0 | V-0 | V-0 | V-0 |
| Flame retardancy, 5V test | judgment |  |  |  | acceptable |  |  |
| Heat distortion temperature | °C. | 75 | 74 | 73 | 72 | 72 | 71 |
| Hydrolysis resistance property | % | 24 | 27 | 51 | 45 | 68 | 77 |

B-1: aromatic polycarbonate resin (product of Idemitsu Petrochemical Co., Ltd., "A-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").
G-1: tetrafluoroethylene (product of Du Pont-Mitsui Florochemicals Co., Ltd., "Teflon (tradename)" 6-J).
G-2: acryl-modified tetrafluoroethylene (product of Mitsubishi Rayon Co., Ltd., "Metablen (tradename)" A-3800).
H-1: versatic acid glycidyl ester (product of Japan Epoxy Resins Co., Ltd., "Cardura E10").
H-2: bisphenol A diglycidyl ether (product of Japan Epoxy Resins Co., Ltd., "Epicote" 828)..
I-1 (alkali-earth metal salt): calcium carbonate (product of Dowa Kalfine Co., Ltd., "KSS1000").
N-1 (hindered phenol-based antioxidant): pentaerythrityl-tetrakis{3-(3,5-t-butyl-4-hydroxyphenyl)propionate}

[Table 10]

TABLE 10

|  |  | Example 45 | Example 46 | Example 47 | Example 48 | Example 49 |
|---|---|---|---|---|---|---|
| Polylactic acid (A) | wt % | 50 | 50 | 50 | 50 | 50 |
| Aromatic polycarbonate (B) | wt % | 50 | 50 | 50 | 50 | 50 |
| Total amount of components (A) and (B) | wt parts | 100 | 100 | 100 | 100 | 100 |
| Component (C) | kind | C-2 | C-2 | C-2 | C-2 | C-2 |
|  | wt parts | 3 | 3 | 3 | 3 | 3 |
| Flame retardant (F) | kind | F-1 | F-1 | F-1 | F-1 | F-1 |
|  | wt parts | 15 | 15 | 15 | 15 | 15 |
| Inorganic filler | kind | — | — | — | — | 1 |
|  | wt parts | — | — | — | — | 5 |
| Fluorine-based resin (G) | kind | G-1 | G-1 | G-1 | G-1 | G-1 |
|  | wt parts | 0.3 | 0.3 | 0.3 | 0.3 | 0.3 |
| Reinforcing fiber (K) | kind | K-1 | — | — | — | — |
|  | wt parts | 15 | — | — | — | — |
| Plasticizer (L) | kind | — | L-1 | L-2 | — | — |
|  | wt parts | — | 5 | 5 | — | — |
| Organized stratified silicate (M) | kind | — | — | — | M-1 | — |
|  | wt parts | — | — | — | 5 | — |
| Phase structure | judgment | ◎ | ◎ | ◎ | ◎ | ◎ |
| Molded article appearance | visual judgment | ○ | ○ | ○ | ○ | ◎ |
| Surface impact | J | 3.5 | 9.5 | 9.5 | 9.0 | 10 |
| Flame retardancy | rank of firing | V-0 | V-0 | V-0 | V-0 | V-0 |
| Flame retardancy, 5V test | judgment | — | — | acceptable | — | — |
| Heat distortion temperature | ° C. | 128 | 85 | 87 | 82 | 77 |
| Hydrolysis resistance property | % | 23 | 16 | 18 | 19 | 22 |

B-1: aromatic polycarbonate resin (product of Idemitsu Petrochemical Co., Ltd., "A-1900").
C-2: ethylene/glycidyl methacrylate-g-polymethyl methacrylate (product of NOF (Corp.), "Modiper" A-4200).
F-1: condensed phosphate (product of Daihachi Chemical Industry Co., Ltd., "PX-200").
G-1: tetrafluoroethylene (product of Du Pont-Mitsui Florochemicals Co., Ltd., "Teflon (tradename)" 6-J).
K-1: chopped strand of glass fiber (product of Nitto Boseki Co., Ltd., CS-3J948).
L-1: ethylene bislauric acid amide (product of NOF (Corp.), "Slipax" L).
L-2: polyethylene•propylene glycol (produce of Asahi Denka, "Pluronic" F68).
M-1: organized stratified silicate (product of CO-OP Chemical, "MTE").
Inorganic filler 1: talc (product of Nippon Talc Co., Ltd., "P-6", average particle diameter of about 4 μm).

From Examples 1-8 of Table 1, it was found that the resin composition the present invention in which the resin components (A), (B) and (C) were compounded is excellent in molded article appearance and impact strength.

From Comparative example 1 of Table 1, it was found that the resin composition in which the component (C) was not compounded was inferior in compatibility, serious in the Barus effect and impossible to take up a strand, and accordingly, pellets could not be obtained.

From Comparative example 2 of Table 1, the resin composition in which the aromatic polycarbonate resin of component (B) was not compounded, was a resin composition inferior in whiteness, impact strength and molded article appearance.

From Examples 9-22 of Tables 2 and 3, in the flame retardant resin compositions in which the components (A), (B), (C) and (F) of the present invention were compounded, ratios of the aromatic polycarbonate resin in the polylactic acid resin were 5% or more, and they can be said to be molded articles comprising a flame retardant resin composition excellent in appearance, surface impact and flame retardancy.

Furthermore, from Example 21, it was found that a material to which an inorganic filler of average particle diameter of 10 μm or less was compounded was excellent in, especially, molded article appearance.

From Comparative examples 3-5 of Table 4, materials to which the component (C) was not compounded exhibited ratios of the aromatic polycarbonate resin in the polylactic acid resin of 5% or less and they can be said to be a molded article poor in molded article appearance and surface impact.

Furthermore, in case of a material where a compounding ratio of the component (C) was in a range of more than that of the present invention as shown in Comparative example 6, there was a defect of molded article appearance caused by thermal distortion due to slow solidification speed in injection molding, and the molded article appearance was judged as X. Accordingly, it can be said that the material of Comparative example 6 is a material which is difficult to apply to molded articles of various applications such as machine structural parts, electric.electronic parts, auto parts, optical equipment, construction materials and daily necessities which are applications of molded article of the present invention.

Furthermore, in case of a material where a compounding amount of component (D) was in a range of more than that of the present invention as shown in Comparative example 7, an extruding/kneading became impossible because component (D) fused to the feeding portion of the 30 mm diameter twin-screw extruder, and it was impossible to obtain a flame retardant resin composition.

The materials of Comparative examples 8-23 of Tables 5 and 6, are materials to which other thermoplastic resin (J) was compounded instead of component (C), but all of them exhibited a ratio of the aromatic polycarbonate resin in the polylactic acid resin of 5% or less, and the molded article appearance and surface impact were insufficient.

The materials of Examples 23-38 in Tables 7 and 8, are materials to which other thermoplastic resin (J) was further compounded to the components (A), (B), (C) and (F) of Example 10 of the present invention, and they exhibited ratios of the aromatic polycarbonate resin in the polylactic acid resin of 5% or more, and they can be said to be molded articles comprising a flame retardant resin composition in which at least one of surface impact or thermal distortion temperature is further improved. Here, the thermal distortion temperature of the material of Example 10 was 73° C.

The materials of Examples 39-49 of Tables 9 and 10, are materials to which a fluorine-based resin (G) was further compounded, and they exhibited the high flame retardancy of V-0, without a decrease of surface impact. Furthermore, the materials other than that of Example 45 can be said to be flame retardant resin compositions which pass the 5V test of flame retardancy.

Furthermore, from Examples 41-44, it can be said that materials to which the epoxy compound (H) is compounded are excellent in hydrolysis resistance property while maintaining the properties of the present invention and flame retardancy, and that materials in which an alkali-earth metal salt and a hindered phenol-based antioxidant are used together are flame retardant resin compositions which have higher hydrolysis resistance property.

Furthermore, the materials of Examples 45-48 are flame retardant resin compositions to which at least one of glass fiber (K), plasticizer (L), organized stratified silicate (M) is compounded, and it can be said that they have effect of improving thermal distortion temperature while maintaining the properties of the present invention and flame retardancy. In particular, glass fiber (K) exhibited a high improving effect of thermal distortion temperature. Further more, the material of Example 49 is a material of Example 39 to which an inorganic filler is compounded, and it can be said that the material has an effect of improving molded article appearance, while maintaining the properties of the present invention and flame retardancy.

Examples 50-61, Comparative Examples 24-25

A poly L-lactic acid resin (A) containing 1.2% D-form having a PMMA converted weight average molecular weight of 160,000, an aromatic polycarbonate resin (B) indicated below, a compatibilizer (D) and an inorganic filler were mixed in the ratio shown respectively in Tables 11 and 12, melt/kneaded by a twin-screw extruder of 30 mm diameter under conditions of cylinder temperature 250° C. and number of rotations 150 rpm, taken up from a dice as a melted gut in a strand state, water-cooled by a cooling bath, and obtained a resin composition pelletized by a strand cutter.

Here, in Tables 11 and 12, the codes of aromatic polycarbonate resin (B) and compatibilizer (D) mean the following substances ("–/–" denotes copolymerization. Hereunder, the same.). Here, the compounding amounts of the (D) and the inorganic filler are those with respect to 100 wt parts of the total amount of the polylactic acid resin (A) and the aromatic polycarbonate resin (B).

B-1: aromatic polycarbonate resin (product of Idemitsu Petrochemical Co., Ltd., "A-1900")
D-1: ethylene/glycidyl methacrylate (product of Sumitomo Chemical, "Bondfast" 2C).
D-2: ethylene/methyl acrylate/glycidyl methacrylate (product of Sumitomo Chemical, "Bondfast" 7M).
D-3: ethylene/ethyl acrylate/maleic anhydride (product of Sumitomo Chemical, "Bondine" HX8290).
D-4: styrene/ethylene/butadiene/maleic anhydride (product of Asahi Kasei Chemicals, "Toughplen" M1943).
D-5: polyethylene/maleic anhydride wax (product of Mitsui Chemicals, "Mitsui Hi-Wax" 1105A).
D-6: polypropylene/maleic anhydride wax (product of Mitsui Chemicals, "Mitsui Hi-Wax" NP0555A).
Inorganic filler 1: talc (product of Nippon Talc Co., Ltd., "P-6", average particle diameter of about 4 μm).

Furthermore, the obtained resin composition was subjected to an injection molding by IS55EPN injection molding machine of Toshiba Machine Co., Ltd. at a cylinder temperature of 240° C. and a mold temperature of 80° C., to thereby obtain various molded articles, and various properties were evaluated according to the above-mentioned methods.

Those results are shown in Tables 11 and 12.

[Table 11]

TABLE 11

| | | Example | | | | | | |
|---|---|---|---|---|---|---|---|---|
| | | 50 | 51 | 52 | 53 | 54 | 55 | 56 |
| Polylactic acid (A) | wt % | 50 | 50 | 50 | 50 | 50 | 50 | 50 |
| Aromatic polycarbonate (B) | wt % | 50 | 50 | 50 | 50 | 50 | 50 | 50 |
| Total amount of components (A) and (B) | wt parts | 100 | 100 | 100 | 100 | 100 | 100 | 100 |
| Component (D) | kind | D-1 | D-2 | D-3 | D-4 | D-5 | D-6 | D-1 |
| | wt parts | 5 | 5 | 5 | 5 | 5 | 5 | 2 |
| Inorganic filler | kind | — | — | — | — | — | — | 1 |
| | wt % | — | — | — | — | — | — | 5 |
| Whiteness | YI value | 3.2 | 3.7 | 3.5 | 4.2 | 3.3 | 3.6 | 2.8 |
| Impact strength | KJ/m$^2$ | 54 | 62 | 56 | 58 | 44 | 42 | 47 |
| Molded article appearance | visual judgment | ◎ | ◎ | ◎ | ◎ | ◎ | ◎ | ◎ |

B-1: aromatic polycarbonate resin (product of Idemitsu Petrochemical Co., Ltd., "A-1900")
D-1: ethylene/glycidyl methacrylate (product of Sumitomo Chemical, "Bondfast" 2C).
D-2: ethylene/methyl acrylate/glycidyl methacrylate (product of Sumitomo Chemical, "Bondfast" 7M).
D-3: ethylene/ethyl acrylate/maleic anhydride (product of Sumitomo Chemical, "Bondine" HX8290).
D-4: styrene/ethylene/butadiene/maleic anhydride (product of Asahi Kasei Chemicals, "Toughplen" M1943).
D-5: polyethylene/maleic anhydride wax (product of Mitsui Chemicals, "Mitsui Hi-Wax" 1105A).
D-6: polypropylene/maleic anhydride wax (product of Mitsui Chemicals, "Mitsui Hi-Wax" NP0555A).
Inorganic filler 1: talc (product of Nippon Talc Co., Ltd., "P-6", average particle diameter of about 4 μm).

[Table 12]

TABLE 12

|  |  | Example | | | | | Comparative example | |
| --- | --- | --- | --- | --- | --- | --- | --- | --- |
|  |  | 57 | 58 | 59 | 60 | 61 | 24 | 25 |
| Polylactic acid (A) | wt % | 50 | 50 | 50 | 50 | 50 | 50 | 100 |
| Aromatic polycarbonate (B) | wt % | 50 | 50 | 50 | 50 | 50 | 50 | — |
| Total amount of components (A) and (B) | wt parts | 100 | 100 | 100 | 100 | 100 | 100 | 100 |
| component (D) | kind | D-2 | D-3 | D-4 | D-5 | D-6 | — | — |
|  | wt parts | 2 | 2 | 2 | 2 | 2 | — | — |
| Inorganic filler | kind | 1 | 1 | 1 | 1 | 1 | — | 1 |
|  | wt % | 5 | 5 | 5 | 5 | 5 | — | 5 |
| Whiteness | YI value | 3.3 | 3.1 | 3.8 | 2.9 | 3.2 | — | 15 |
| Impact strength | KJ/m² | 51 | 45 | 49 | 41 | 40 | — | 12 |
| Molded article appearance | visual judgment | ◎ | ◎ | ◎ | ◎ | ◎ | XX | Δ |

B-1: aromatic polycarbonate resin (product of Idemitsu Petrochemical Co., Ltd., "A-1900")
D-2: ethylene/methyl acrylate/glycidyl methacrylate (product of Sumitomo Chemical, "Bondfast" 7M).
D-3: ethylene/ethyl acrylate/maleic anhydride (product of Sumitomo Chemical, "Bondine" HX8290).
D-4: styrene/ethylene/butadiene/maleic anhydride (product of Asahi Kasei Chemicals, "Toughplen" M1943).
D-5: polyethylene/maleic anhydride wax (product of Mitsui Chemicals, "Mitsui Hi-Wax" 1105A).
D-6: polypropylene/maleic anhydride wax (product of Mitsui Chemicals, "Mitsui Hi-Wax" NP0555A).
Inorganic filler 1: talc (product of Nippon Talc Co., Ltd., "P-6", average particle diameter of about 4 μm).

From Examples 50-61 of Tables 11 and 12, the resin composition of the present invention to which the components (A), (B) and (D) were compounded can be said to be a molded article comprising a resin composition excellent in whiteness, impact strength and surface appearance.

From Comparative example 24 of Table 12, it was found that the resin composition to which a compatibilizer of the component (D) was not compounded was inferior in compatibility, serious in the Barus effect and impossible to make a strand, and accordingly, pellets could not be obtained.

From Comparative example 25 of Table 12, the resin composition to which an aromatic polycarbonate resin of the component (B) was not compounded was a resin composition inferior in whiteness, impact strength and molded article appearance.

Examples 62-96, Comparative Examples 26-43

A poly L-lactic acid resin (A) containing 1.2% D-form having a PMMA converted weight average molecular weight of 160,000, an aromatic polycarbonate resin mentioned below, a compatibilizer, various kinds of flame retardant, a fluorine-based resin, an epoxy compound, an alkali-earth metal salt, other thermoplastic resin, a reinforcing fiber, a stratified silicate, a plasticizer, other stabilizer, were mixed in mixing ratios shown in Tables 13-20, respectively, melt/kneaded by a twin-screw extruder of 30 mm diameter under conditions of cylinder temperature 250° C. and number of rotations 150 rpm, taken up from a dice as a melted gut in a strand state, water-cooled by a cooling bath, and obtained a resin composition pelletized by a strand cutter.

Here, in Tables 13-20, the codes of the aromatic polycarbonate resin (B), the at least one kind selected from oxazoline compound, oxazine compound and carbodiimide compound (E), the inorganic filler, the flame retardant (F), the fluorine-based resin (G), the epoxy compound (H), the alkali-earth metal salt (I), the other thermoplastic resin (J), the reinforcing fiber (K), the plasticizer (L),the stratified silicate (M), the other additives (N) denote the following substances. Here, the compounding amounts of the components (E)-(N) are those with respect to 100 wt parts of the total amount of the polylactic acid resin (A) and the aromatic polycarbonate resin (B).

B-1: aromatic polycarbonate resin (product of Idemitsu Petrochemistry (Inc.), "A-1900").
E-1: carbodiimide compound (product of Nisshinbo Industries, Inc., Carbodilite HMV-8CA).
E-2: bisoxazoline/maleic anhydride modified polyethylene (product of Mikuni Pharmaceutical Industrial Co., Ltd.).
inorganic filler 1: talc (product of Nippon Talc Co., Ltd., "P-6", average particle diameter of about 4 μm).
inorganic filler 2: talc (product of Nippon Talc Co., Ltd., "MS-P", average particle diameter of about 12 μm).
F-1: condensed phosphate (product of Daihachi Chemical Industry Co., Ltd., "PX-200").
F-2: triphenyl phosphate (product of Daihachi Chemical Industry Co., Ltd., "TPP").
F-3: melamine cyanurate (product of Nissan Chemical Industries, Ltd, "MC-440").
F-4: ammonium polyphosphate (product of Suzuhiro Chemical Co., Ltd., "Firecut" FCP730).
F-5: melamine polyphosphate (product of DSM, "Melapur" 200).
F-6: zinc borate (product of Borax Co., "Firebreak" ZB).
G-1: tetrafluoroethylene (product of Du Pont-Mitsui Florochemicals Co., Ltd., "Teflon (tradename)" 6-J).
G-2: acryl-modified tetrafluoroethylene (product of Mitsubishi Rayon Co., Ltd., "Metablen (tradename)" A-3800).
H-1: versatic acid glycidyl ester (product of Japan Epoxy Resins Co., Ltd., "Cardura E10").
H-2: bisphenol A diglycidyl ether (product of Japan Epoxy Resins Co., Ltd., "Epicote" 828).
I-1 (alkali-earth metal salt): calcium carbonate (product of Dowa Kalfine Co., Ltd., "KSS1000").
J-1: Nylon 6 resin (product of Toray Industries, Inc., "Amilan" CM1010).
J-2: polybutylene (terephthalate/adipate) resin (product of BASF, "Ecoflex").
J-3: silicone-acryl composite core-shell rubber (product of Mitsubishi Rayon Co., "Metablen" SX-005).
J-4: polyester elastomer resin (product of Du Pont-Toray Co., Ltd., "Hytrel" 4057).

J-5: AS resin (styrene/acrylonitrile=74/26, product of Toray Industries, Inc.).
J-6: polybutylene terephthalate (product of Toray Industries, Inc., "Toraycon" 1401X31).
J-7: polytrimethylene terephthalate resin (product of SHELL, "Corterra").
J-8: polyethylene (terephthalate/succinate) resin (product of Du Pont, "Biomax").
J-9: Nylon 6/polyethylene glycol resin (product of Sanyo Chemical Industries, Ltd., "Pellestat").
J-10: polybutylene succinate resin (product of Showa High-polymer Co., Ltd., "Bionole" 1001).
J-11: polymethyl methacrylate resin (product of Sumitomo Chemical, "Sumipex" LG35).
J-12: polycaprolactone resin (product of Daicel Chemical Industries, Ltd., "Praccel" H7).
J-13: cellulose acetate propionate (product of Eastman Chemical Co., "CAP", degree of acetate substitution 0.1, degree of propionate substitution 2.93).
K-1: chopped strand of glass fiber (product of Nitto Boseki Co., Ltd., CS-3J948).
L-1: ethylene bislauric acid amide (product of NOF (Corp.), "Slipax" L).
L-2: polyethylene propylene glycol (product of Asahi Denka, "Pluronic" F68).
M-1: organized stratified silicate (product of CO-OP Chemical, "MTE").
N-1 (hindered phenol-based antioxidant): pentaerythrityl-tetrakis{3-(3,5-t-butyl-4-hydroxyphenyl) propionate} (product of Japan Ciba-Geigy, "Irganox" 1010).

Furthermore, the obtained resin composition was subjected to an injection molding by IS55EPN injection molding machine of Toshiba Machine Co., Ltd. at a cylinder temperature of 240° C. and a mold temperature of 80° C., to thereby obtain various molded articles, and various properties were evaluated according to the above-mentioned methods.

Those results are shown together in Tables 13-20.

[Table 13]

TABLE 13

|  |  | Example |  |  |  |  |  |
| --- | --- | --- | --- | --- | --- | --- | --- |
|  |  | 62 | 63 | 64 | 65 | 66 | 67 |
| Polylactic acid (A) | wt % | 25 | 50 | 75 | 50 | 50 | 50 |
| Aromatic polycarbonate (B) | wt % | 75 | 50 | 25 | 50 | 50 | 50 |
| Total amount of components (A) and (B) | wt parts | 100 | 100 | 100 | 100 | 100 | 100 |
| Component (E) | kind | E-1 | E-1 | E-1 | E-2 | E-2 | E-2 |
|  | wt parts | 2 | 2 | 2 | 10 | 10 | 10 |
| Inorganic filler | kind | — | — | — | — | 1 | 2 |
|  | wt parts | — | — | — | — | 5 | 5 |
| Molded article appearance | visual judgment | ○ | ○ | ○ | ○ | ◉ | ○ |
| Flowability | kg/cm$^2$ | 53 | 44 | 38 | 35 | 33 | 39 |
| Hydrolysis resistance property | % | 37 | 30 | 32 | 35 | 37 | 33 |
| Flame retardancy | rank of firing |  |  | out of standard |  |  |  |
| Heat distortion temperature | ° C. | 86 | 75 | 64 | 62 | 64 | 64 |

B-1: aromatic polycarbonate resin (product of Idemitsu Petrochemical Co., Ltd., "A-1900").
E-1: carbodiimide compound (product of Nisshinbo Industries, Inc., Carbodilite HMV-8CA)
E-2: bisoxazoline/maleic anhydride modified polyethylene (product of Mikuni Pharmaceutical Industrial Co., Ltd.).
Inorganic filler 1: talc (product of Nippon Talc Co., Ltd., "P-6", average particle diameter of about 4 μm).
Inorganic filler 2: talc (product of Nippon Talc Co., Ltd., "MS-P", average particle diameter of about 12 μm).

[Table 14]

TABLE 14

|  |  | Comparative example |  |  |  |  |
| --- | --- | --- | --- | --- | --- | --- |
|  |  | 26 | 27 | 28 | 29 | 30 |
| Polylactic acid (A) | wt % | 25 | 50 | 75 | 50 | 50 |
| Aromatic polycarbonate (B) | wt % | 75 | 50 | 25 | 50 | 50 |
| Total amount of components (A) and (B) | wt parts | 100 | 100 | 100 | 100 | 100 |
| Component (E) | kind | — | — | — | E-1 | E-2 |
|  | wt parts | — | — | — | 20 | 20 |
| Molded article appearance | visual judgment | X | X | X | — | X |
| Flowability | kg/m$^2$ | 76 | 67 | 61 | — | 22 |
| Hydrolysis resistance property | % | 16 | 9 | 12 | — | 30 |
| Flame retardancy | rank of firing | out of standard |  |  | — | out of standard |
| Heat distortion temperature | ° C. | 88 | 78 | 67 | — | 44 |

B-1: aromatic polycarbonate resin (product of Idemitsu Petrochemical Co., Ltd., "A-1900").
E-1: carbodiimide compound (product of Nisshinbo Industries, Inc., Carbodilite HMV-8CA)
E-2: bisoxazoline/maleic anhydride modified polyethylene (product of Mikuni Pharmaceutical Industrial Co., Ltd.).

[Table 15]

TABLE 15

| | | Comparative example | | | | | | |
|---|---|---|---|---|---|---|---|---|
| | | 31 | 32 | 33 | 34 | 35 | 36 | 37 |
| Polylactic acid (A) | wt % | 50 | 50 | 50 | 50 | 50 | 50 | 50 |
| Aromatic polycarbonate (B) | wt % | 50 | 50 | 50 | 50 | 50 | 50 | 50 |
| Total amount of components (A) and (B) | wt parts | 100 | 100 | 100 | 100 | 100 | 100 | 100 |
| Other thermoplastic resin (J) | kind | J-1 | J-2 | J-3 | J-4 | J-5 | J-6 | J-7 |
| | wt parts | 10 | 10 | 10 | 10 | 10 | 10 | 10 |
| Molded article appearance | visual judgment | X | X | X | X | X | X | X |
| Flowability | kg/cm$^2$ | 63 | 50 | 52 | 57 | 41 | 62 | 64 |
| Hydrolysis resistance property | % | 14 | 12 | 12 | 8 | 12 | 12 | 12 |
| Flame retardancy | rank of firing | | | Out of standard | | | | |
| Heat distortion temperature | ° C. | 75 | 63 | 65 | 66 | 80 | 74 | 76 |

B-1: aromatic polycarbonate resin (product of Idemitsu Petrochemical Co., Ltd., "A-1900").
J-1: Nylon 6 resin (product of Toray Industries, Inc., "Amilan" CM1010).
J-2: polybutylene (terephthalate/adipate) resin (product of BASF, "Ecoflex").
J-3: silicone•acryl composite core-shell rubber (product of Mitsubishi Rayon Co., "Metablen" SX-005).
J-4: polyester elastomer resin (product of Du Pont-Toray Co., Ltd., "Hytrel" 4057).
J-5: AS resin (styrene/acrylonitrile = 74/26, product of Toray Industries, Inc.).
J-6: polybutylene terephthalate (product of Toray Industries, Inc., "Toraycon" 1401X31).
J-7: polytrimethylene terephthalate resin (product of SHELL, "Corterra").

[Table 16]

TABLE 16

| | | Comparative example | | | | | |
|---|---|---|---|---|---|---|---|
| | | 38 | 39 | 40 | 41 | 42 | 43 |
| Polylactic acid (A) | wt % | 50 | 50 | 25 | 50 | 50 | 50 |
| Aromatic polycarbonate (B) | wt % | 50 | 50 | 75 | 50 | 50 | 50 |
| Total amount of components (A) and (B) | wt parts | 100 | 100 | 100 | 100 | 100 | 100 |
| Other thermoplastic resin (J) | kind | J-8 | J-9 | J-10 | J-11 | J-12 | J-13 |
| | wt parts | 10 | 10 | 10 | 10 | 10 | 10 |
| Molded article appearance | visual judgment | X | X | X | X | X | X |
| Flowability | kg/cm$^2$ | 51 | 49 | 47 | 62 | 39 | 54 |
| Hydrolysis resistance property | % | 11 | 10 | 8 | 10 | 6 | 8 |
| Flame retardancy | rank of firing | | | out of standard | | | |
| Heat distortion temperature | ° C. | 70 | 67 | 59 | 74 | 74 | 80 |

B-1: aromatic polycarbonate resin (product of Idemitsu Petrochemical Co., Ltd., "A-1900").
J-8: polyethylene (terephthalate/succinate) resin (product of Du Pont, "Biomax").
J-9: Nylon 6/polyethylene glycol resin (Sanyo Chemical Industries, Ltd., "Pellestat").
J-10: polybutylene succinate resin (product of Showa Highpolymer Co., Ltd., "Bionole" 1001).
J-11: polymethylmethacrylate resin (product of Sumitomo Chemical, "Sumipex" LG35).
J-12: polycaprolactone resin (product of Daicel Chemical Industries, Ltd., "Praccel" H7)
J-13: cellulose acetate propionate (product of Eastman Chemical Co., "CAP", degree of acetate substitution 0.1, degree of propionate substitution 2.93).

[Table 17]

TABLE 17

| | | Example | | | | | |
|---|---|---|---|---|---|---|---|
| | | 68 | 69 | 70 | 71 | 72 | 73 |
| Polylactic acid (A) | wt % | 50 | 50 | 50 | 50 | 50 | 50 |
| Aromatic polycarbonate (B) | wt % | 50 | 50 | 50 | 50 | 50 | 50 |
| Total amount of components (A) and (B) | wt parts | 100 | 100 | 100 | 100 | 100 | 100 |
| Component (E) | kind | E-2 | E-2 | E-2 | E-2 | E-2 | E-2 |
| | wt parts | 10 | 10 | 10 | 10 | 10 | 10 |
| Other thermoplastic resin (H) | kind | J-1 | J-2 | J-3 | J-4 | J-5 | J-6 |
| | wt parts | 10 | 10 | 10 | 10 | 10 | 10 |
| Molded article appearance | visual judgment | ○ | ○ | ○ | ○ | ○ | ○ |

TABLE 17-continued

|  |  | Example | | | | | |
|---|---|---|---|---|---|---|---|
|  |  | 68 | 69 | 70 | 71 | 72 | 73 |
| Flowability | kg/cm² | 50 | 35 | 38 | 42 | 44 | 48 |
| Hydrolysis resistance property | % | 37 | 34 | 34 | 32 | 36 | 33 |
| Flame retardancy | rank of firing | | | out of standard | | | |
| Heat distortion temperature | ° C. | 76 | 68 | 60 | 61 | 76 | 73 |

B-1: aromatic polycarbonate resin (product of Idemitsu Petrochemical Co., Ltd., "A-1900").
E-2: bisoxazoline/maleic anhydride modified polyethylene (product of Mikuni Pharmaceutical Industrial Co., Ltd.).
J-1: Nylon 6 resin (product of Toray Industries, Inc., "Amilan" CM1010).
J-2: polybutylene (terephthalate/adipate) resin (Product of BASF, "Ecoflex").
J-3: silicone•acryl composite core-shell rubber (product of Mitsubishi Rayon Co., "Metablen" SX-005).
J-4: polyester elastomer resin (product of Du Pont-Toray Co., Ltd., "Hytrel" 4057).
J-5: AS resin (styrene/acrylonitrile = 74/26, product of Toray Industries, Inc.).
J-6: polybutylene terephthalate (product of Toray Industries, Inc., "Toraycon" 1401X31).

[Table 18]

TABLE 18

|  |  | Example | | | | | | |
|---|---|---|---|---|---|---|---|---|
|  |  | 74 | 75 | 76 | 77 | 78 | 79 | 80 |
| Polylactic acid (A) | wt % | 50 | 50 | 50 | 25 | 50 | 50 | 50 |
| Aromatic polycarbonate (B) | wt % | 50 | 50 | 50 | 75 | 50 | 50 | 50 |
| Total amount of components (A) and (B) | wt parts | 100 | 100 | 100 | 100 | 100 | 100 | 100 |
| Component (E) | kind | E-2 | E-2 | E-2 | E-2 | E-2 | E-2 | E-2 |
|  | wt parts | 10 | 10 | 10 | 10 | 10 | 10 | 10 |
| Other thermoplastic resin (H) | kind | J-7 | J-8 | J-9 | J-10 | J-11 | J-12 | J-13 |
|  | wt parts | 10 | 10 | 10 | 10 | 10 | 10 | 10 |
| Molded article appearance | visual judgment | ○ | ○ | ○ | ○ | ⊚ | ○ | ⊚ |
| Flowability | kg/cm² | 50 | 35 | 35 | 50 | 49 | 28 | 37 |
| Hydrolysis resistance property | % | 34 | 33 | 31 | 28 | 30 | 26 | 28 |
| Flame retardancy | rank of firing | | | | Out of standard | | | |
| Heat distortion temperature | ° C. | 75 | 65 | 62 | 55 | 69 | 71 | 73 |

B-1: aromatic polycarbonate resin (product of Idemitsu Petrochemical Co., Ltd., "A-1900").
E-2: bisoxazoline/maleic anhydride modified polyethylene (product of Mikuni Pharmaceutical Industrial Co., Ltd.).
J-7: polytrimethylene terephthalate resin (product of SHELL, "Corterra").
J-8: polyethylene (terephthalate/succinate) resin (product of Du Pont, "Biomax").
J-9: Nylon 6/polyethylene glycol resin (Sanyo Chemical Industries, Ltd., "Pellestat").
J-10: polybutylene succinate resin (product of Showa Highpolymer Co., Ltd., "Bionole" 1001).
J-11: polymethylmethacrylate resin (product of Sumitomo Chemical, "Sumipex" LG35).
J-12: polycaprolactone resin (product of Daicel Chemical Industries, Ltd., "Praccel" H7)
J-13: cellulose acetate propionate (product of Eastman Chemical Co., "CAP", degree of acetate substitution 0.1, degree of propionate substitution 2.93).

[Table 19]

TABLE 19

|  |  | Example | | | | | | | |
|---|---|---|---|---|---|---|---|---|---|
|  |  | 81 | 82 | 83 | 84 | 85 | 86 | 87 | 88 |
| Polylactic acid (A) | wt % | 50 | 50 | 75 | 50 | 50 | 50 | 50 | 50 |
| Aromatic polycarbonate (B) | wt % | 50 | 50 | 25 | 50 | 50 | 50 | 50 | 50 |
| Total amount of components (A) and (B) | wt parts | 100 | 100 | 100 | 100 | 100 | 100 | 100 | 100 |
| Component (E) | kind | E-2 | E-2 | E-2 | E-2 | E-2 | E-2 | E-2 | E-2 |
|  | wt parts | 10 | 10 | 10 | 10 | 10 | 10 | 10 | 10 |
| Flame retardant (F) | kind | F-1 | F-2 | F-3 | F-4 | F-5 | F-6 | F-1 | F-1 |
|  | wt parts | 15 | 20 | 20 | 20 | 20 | 20 | 15 | 15 |
| Fluorine-based resin (G) | kind | — | — | — | — | — | — | G-1 | G-2 |
|  | wt parts | — | — | — | — | — | — | 0.3 | 0.3 |
| Molded article appearance | visual judgment | ○ | ○ | ○ | ○ | ○ | ○ | ○ | ○ |
| Flowability | kg/cm² | 32 | 30 | 53 | 50 | 55 | 52 | 36 | 34 |
| Hydrolysis resistance property | % | 29 | 20 | 23 | 15 | 15 | 16 | 22 | 35 |

TABLE 19-continued

|  |  | Example | | | | | | | |
|---|---|---|---|---|---|---|---|---|---|
|  |  | 81 | 82 | 83 | 84 | 85 | 86 | 87 | 88 |
| Flame retardancy | rank of firing | V-2 | V-2 | V-2 | V-2 | V-2 | V-2 | V-0 | V-0 |
| Heat distortion temperature | °C. | 72 | 73 | 78 | 77 | 76 | 75 | 74 | 73 |

B-1: aromatic polycarbonate resin (product of Idemitsu Petrochemical Co., Ltd., "A-1900").
E-2: bisoxazoline/maleic anhydride modified polyethylene (product of Mikuni Pharmaceutical Industrial Co., Ltd.).
F-1: condensed phosphate (product of Daihachi Chemical Industry Co., Ltd., "PX-200").
F-2: triphenyl phosphate (product of Daihachi Chemical Industry Co., Ltd., "TPP").
F-3: melamine cyanurate (product of Nissan Chemical Industries, Ltd., "MC-440").
F-4: ammonium polyphosphate (product of Suzuhiro Chemical Co., Ltd., "Firecut" FCP730).
F-5: melamine polyphosphate (product of DSM, "Melapur" 200).
F-6: zinc borate (product of Borax Co., "Firebreak" ZB).
G-1: tetrafluoroethylene (product of Du Pont-Mitsui Florochemicals Co., Ltd., "Teflon (tradename)" 6-J).
G-2: acryl-modified tetrafluoroethylene (product of Mitsubishi Rayon Co., Ltd., "Metablen (tradename)" A-3800).

[Table 20]

TABLE 20

|  |  | Example | | | | | | | |
|---|---|---|---|---|---|---|---|---|---|
|  |  | 89 | 90 | 91 | 92 | 93 | 94 | 95 | 96 |
| Polylactic acid (A) | wt % | 50 | 50 | 50 | 50 | 50 | 50 | 50 | 50 |
| Aromatic polycarbonate (B) | wt % | 50 | 50 | 50 | 50 | 50 | 50 | 50 | 50 |
| Total amount of components (A) and (B) | wt parts | 100 | 100 | 100 | 100 | 100 | 100 | 100 | 100 |
| Component (E) | kind | E-2 | E-2 | E-2 | E-2 | E-2 | E-2 | E-2 | E-2 |
|  | wt parts | 10 | 10 | 10 | 10 | 10 | 10 | 10 | 10 |
| Flame retardant (F) | kind | F-1 | F-1 | F-1 | F-1 | F-1 | F-1 | F-1 | F-1 |
|  | wt parts | 15 | 15 | 15 | 15 | 15 | 15 | 15 | 15 |
| Fluorine-based resin (G) | kind | G-1 | G-1 | G-1 | G-1 | G-1 | G-1 | G-1 | G-1 |
|  | wt parts | 0.3 | 0.3 | 0.3 | 0.3 | 0.3 | 0.3 | 0.3 | 0.3 |
| Epoxy compound (H) | kind | H-1 | H-2 | H-2 | H-2 | — | — | — | — |
|  | wt parts | 0.5 | 0.5 | 0.5 | 0.5 | — | — | — | — |
| Alkali-earth metal salt (I) | kind | — | — | I-1 | I-1 | — | — | — | — |
|  | wt parts | — | — | 0.2 | 0.2 | — | — | — | — |
| Hindered phenol-based antioxidant (N) | kind | — | — | — | N-1 | — | — | — | — |
|  | wt parts | — | — | — | 0.2 | — | — | — | — |
| Reinforcing fiber (K) | kind | — | — | — | — | K-1 | — | — | — |
|  | wt parts | — | — | — | — | 15 | — | — | — |
| Plasticizer (L) | kind | — | — | — | — | — | L-1 | L-2 | — |
|  | wt parts | — | — | — | — | — | 5 | 5 | — |
| Organized stratified silicate (M) | kind | — | — | — | — | — | — | — | M-1 |
|  | wt parts | — | — | — | — | — | — | — | 5 |
| Molded article appearance | visual judgment | ○ | ○ | ○ | ○ | ○ | ○ | ○ | ○ |
| Flowability | kg/cm$^2$ | 33 | 34 | 34 | 34 | 56 | 34 | 36 | 37 |
| Hydrolysis resistance property | % | 59 | 53 | 75 | 84 | 30 | 23 | 25 | 27 |
| Flame retardancy | rank of firing | V-0 | V-0 | V-0 | V-0 | V-2 | V-2 | V-2 | V-2 |
| Heat distortion temperature | °C. | 72 | 72 | 72 | 72 | 127 | 85 | 87 | 80 |

B-1: aromatic polycarbonate resin (product of Idemitsu Petrochemical Co., Ltd., "A-1900").
E-2: bisoxazoline/maleic anhydride modified polyethylene (product of Mikuni Pharmaceutical Industrial Co., Ltd.).
F-1: condensed phosphate (product of Daihachi Chemical Industry Co., Ltd., "PX-200").
G-1: tetrafluoroethylene (product of Du Pont-Mitsui Florochemicals Co., Ltd., "Teflon (tradename)" 6-J).
H-1: versatic acid glycidyl ester (product of Japan Epoxy Resins Co., Ltd., "Cardura E10").
H-2: Bisphenol A diglycidyl ether (product of Japan Epoxy Resins Co., Ltd., "Epicote" 828).
I-1 (alkali-earth metal salt): calcium carbonate (product of Dowa Kalfine Co., Ltd., "KSS1000").
K-1: chopped strand of glass fiber (product of Nitto Boseki Co., Ltd., CS-3J948).
L-1: ethylene bislauric acid amide (product of NOF (Corp.), "Slipax" L).
L-2: polyethylene·propylene glycol (produce of Asahi Denka, "Pluronic" F68).
M-1: organized stratified silicate (product of CO-OP Chemical, "MTE").
N-1 (hindered phenol-based antioxidant): pentaerythrityl-tetrakis{3-(3,5-t-butyl-4-hydroxyphenyl) propionate}

From Examples 62-67 of Table 13, the resin compositions of the present invention to which the components (A), (B) and (E) were compounded can be said to be molded articles comprising resin compositions excellent in molded article appearance, flowability at molding and hydrolysis resistance property.

Furthermore, from Examples 66-67, materials to which talc which is a filler of average particle diameter of 10 μm or less was further compounded were excellent, especially, in molded article appearance.

From Comparative examples 26-28 of Table 14, it can be said that resin compositions to which the component (E) is not compounded are molded articles poor in molded article appearance and flowability.

The resin composition, shown in Comparative example 29 of Table 14, of which compounding ratio of carbodiimide compound, which is the component (E), exceeds the range of the present invention was difficult to take up due to instability of strand extruded from a die when melt/kneaded, and could not be obtained as a product.

The resin composition, shown in Comparative example 30 of Table 14, of which compounding ratio of bisoxazoline/maleic anhydride modified polyethylene, which is the component (E), exceeds the range of the present invention was, due to its surface unevenness, difficult to be judged on pearl gloss and surface foliation and greatly damaged in product quality, and accordingly, its visual judgment of molded article appearance was classified as X.

The resin compositions of Comparative examples 31-43 of Tables 15 and 16, were resin compositions to which other thermoplastic resins (J) were compounded instead of the component (E), but all of them were insufficient in molded article appearance.

From comparison of Examples 68-80 of Tables 17 and 18 and Comparative examples 31-43 of the above-described Tables 15 and 16, the resin compositions of (A), (B) and the component (E) of the present invention to which other thermoplastic resins (J) were further compounded, can be said to be resin compositions further improved in molded article appearance, flowability at molding and hydrolysis resistance property.

The resin compositions of Examples 81-96 of Tables 19 and 20, were resin compositions to which the flame retardants (F) were further compounded, and they can be said to be molded articles excellent in molded article appearance and flowability, to which flame retardancy is further imparted.

In particular, from Example 81, by a material in which a specified condensed phosphate is used, an excellent flame retardancy was obtained in a small compounding ratio.

Furthermore, from Examples 87-88, the materials to which the fluorine-based resin (G) was further compounded do not show a drip at firing and exhibit a higher flame retardancy, V-0, and it can be said that they have an effect of improving flame retardancy.

Furthermore, from Examples 89-92, materials to which the epoxy compound (H) was further compounded were, while maintaining the properties of the present invention and flame retardancy, more excellent in hydrolysis resistance property, and materials to which alkali-earth metal salt or hindered phenol-based antioxidant was used together exhibited a still more excellent hydrolysis resistance property.

Furthermore, Examples 93-96 relate to resin compositions to which at least one of glass fiber which is a fibrous filler (K), plasticizer (L) and organized stratified silicate (M) is compounded, and it can be said that they have an effect of improving thermal distortion temperature, while maintaining the properties of the present invention and flame retardancy. In particular, the glass fiber which is a fibrous filler (K) exhibited a high improving effect of thermal distortion temperature.

INDUSTRIAL APPLICABILITY

The resin composition of the present invention is excellent in molded article appearance and impact strength, especially, such as in surface impact, and therefore, it is a resin composition preferable for housings of OA equipment and electric equipment.

BRIEF EXPLANATION OF THE DRAWINGS

FIG. 1 An illustration showing a phase structure of the present invention in which the aromatic polycarbonate resin component (B) is contained in the polylactic acid resin component (A).

FIG. 2 An illustration showing a phase structure of the present invention in which the aromatic polycarbonate resin component (B) is contained in the polylactic acid resin component (A), and at the same time, the polylactic acid resin component (A) is contained in the aromatic polycarbonate resin component (B).

FIG. 3 An illustration showing a phase structure of a polylactic acid resin and an aromatic polycarbonate resin of conventional arts.

The invention claimed is:

1. A resin composition comprising a polylactic acid resin (A) in the amount of 75-10 wt %, an aromatic polycarbonate resin (B) in the amount of 25-90 wt %, and at least one compatibilizer (E) in the amount of 0.1-15 wt parts with respect to 100 wt parts of the total of the component (A) and the component (B), wherein the at least one compatibilizer (E) is selected from the group consisting of bisoxazoline/maleic anhydride modified polyethylenes, bisoxazoline/styrene/maleic anhydride copolymers, bisoxazoline/maleic anhydride modified polypropylenes, and mixtures thereof.

2. A resin composition according to claim 1, wherein a flame retardant (F) 0.1-50 wt parts with respect to 100 wt parts of the total of the component (A) and the component (B), is compounded.

3. A resin composition according to claim 2, wherein the flame retardant (F) comprises one or more selected from a bromine-based flame retardant, phosphorus-based flame retardant, nitrogen compound-based flame retardant, silicone-based flame retardant and inorganic flame retardant.

4. A resin composition according to claim 1, to which a fluorine-based resin (G) is further compounded.

5. A resin composition according to claim 2, wherein a flame retardancy according to the UL standard with a molded article of 1.6 mm thickness (1/16 inch) is any one of the flame retardancies V-2, V-1 and V-0.

6. A resin composition according to claim 2, wherein a flame retardancy according to the UL standard with a molded article of 1.6 mm thickness (1/16 inch) is the flame retardancy 5V.

7. A molded article comprising the resin composition described in claim 1.

8. A molded article according to claim 7, wherein the molded article is a housing of an OA equipment or electric equipment.

* * * * *